(12) United States Patent
Guo et al.

(10) Patent No.: US 10,764,896 B2
(45) Date of Patent: Sep. 1, 2020

(54) METHOD AND APPARATUS FOR BEAM MANAGEMENT IN THE UNLICENSED SPECTRUM

(71) Applicant: Samsung Electronics Co., Ltd, Suwon-si, Gyeonggi-do (KR)

(72) Inventors: Li Guo, Allen, TX (US); Eko Onggosanusi, Coppell, TX (US); Hongbo Si, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 16/175,532

(22) Filed: Oct. 30, 2018

(65) Prior Publication Data

US 2019/0141693 A1 May 9, 2019

Related U.S. Application Data

(60) Provisional application No. 62/583,144, filed on Nov. 8, 2017, provisional application No. 62/598,203, filed
(Continued)

(51) Int. Cl.
*H04W 72/04* (2009.01)
*H04W 16/14* (2009.01)
(Continued)

(52) U.S. Cl.
CPC ........... *H04W 72/046* (2013.01); *H04B 7/00* (2013.01); *H04L 5/0044* (2013.01);
(Continued)

(58) Field of Classification Search
CPC ............. H04W 72/042; H04W 72/046; H04W 72/1268; H04W 72/1289; H04W 16/14;
(Continued)

(56) References Cited

U.S. PATENT DOCUMENTS 10,245,835 B2 * 4/2019 Tone ................... B41J 2/1652
2014/0029561 A1 * 1/2014 Kim ................... H04W 72/042
370/329
(Continued)

FOREIGN PATENT DOCUMENTS

WO 2017/027055 A1 2/2017
WO 2017/151876 A1 9/2017

OTHER PUBLICATIONS

"3rd Generation Partnership Project; Technical Specification Group Radio Access Network; Evolved Universal Terrestrial Radio Access (E-UTRA); Physical Channels and Modulation (Release 14)," 3GPP TS 36.211 V14.1.0, Dec. 2016, 175 pages.
(Continued)

*Primary Examiner* — Kevin D Mew

(57) ABSTRACT

A method of a user equipment (UE) in a wireless communication system is provided. The method comprises receiving, from a base station (BS), configuration information identifying a set of physical uplink control channel (PUCCH) resources, wherein each of the set of PUCCH resources is identified via an identifier (ID) and information associated with a transmit (Tx) beam; receiving, from the BS, a downlink control information (DCI) format to schedule a transmission over a physical uplink shared channel (PUSCH); identifying scheduling information for the transmission over the PUSCH based on the DCI format; configuring a Tx beam for the PUSCH based on the configuration information for the set of PUCCH resources; and transmitting, to the BS, data over the PUSCH based on the scheduling information using the Tx beam.

17 Claims, 17 Drawing Sheets

Related U.S. Application Data on Dec. 13, 2017, provisional application No. 62/616,825, filed on Jan. 12, 2018, provisional application No. 62/621,210, filed on Jan. 24, 2018, provisional application No. 62/626,948, filed on Feb. 6, 2018, provisional application No. 62/626,970, filed on Feb. 6, 2018, provisional application No. 62/634,998, filed on Feb. 26, 2018, provisional application No. 62/652,668, filed on Apr. 4, 2018, provisional application No. 62/658,008, filed on Apr. 16, 2018, provisional application No. 62/659,363, filed on Apr. 18, 2018, provisional application No. 62/674,676, filed on May 22, 2018, provisional application No. 62/725,776, filed on Aug. 31, 2018.

(51) Int. Cl.
    *H04W 72/12* (2009.01)
    *H04L 5/00* (2006.01)
    *H04B 7/00* (2006.01)

(52) U.S. Cl.
    CPC .......... *H04L 5/0053* (2013.01); *H04W 16/14* (2013.01); *H04W 72/042* (2013.01); *H04W 72/1268* (2013.01); *H04L 5/001* (2013.01); *H04L 5/0023* (2013.01); *H04L 5/0048* (2013.01); *H04W 72/1289* (2013.01)

(58) Field of Classification Search
    CPC ..... H04L 5/0044; H04L 5/0053; H04L 5/001; H04L 5/0023; H04L 5/0048; H04B 7/00
    See application file for complete search history.

(56) References Cited

U.S. PATENT DOCUMENTS

| | | | | |
|---|---|---|---|---|
| 2014/0369242 | A1* | 12/2014 | Ng | H04L 5/0098 370/280 |
| 2015/0327229 | A1* | 11/2015 | Zhang | H04L 1/1854 370/280 |
| 2016/0100422 | A1* | 4/2016 | Papasakellariou | H04L 1/1861 370/329 |
| 2016/0211949 | A1* | 7/2016 | You | H04W 4/70 |
| 2017/0245260 | A1* | 8/2017 | Islam | H04L 5/0057 |
| 2017/0303263 | A1* | 10/2017 | Islam | H04B 7/0408 |
| 2017/0359114 | A1* | 12/2017 | Akkarakaran | H04B 7/0697 |
| 2018/0048375 | A1* | 2/2018 | Guo | H04B 7/088 |
| 2018/0092129 | A1* | 3/2018 | Guo | H04L 5/0048 |
| 2018/0220403 | A1* | 8/2018 | Wilson | H04W 72/044 |
| 2018/0310283 | A1* | 10/2018 | Deenoo | H04W 72/042 |
| 2018/0323855 | A1* | 11/2018 | Noh | H04B 7/0695 |
| 2018/0332541 | A1* | 11/2018 | Liu | H04W 52/241 |
| 2018/0368188 | A1* | 12/2018 | Aiba | H04L 5/00 |
| 2019/0045494 | A1* | 2/2019 | Ho | H04W 76/27 |
| 2019/0068268 | A1* | 2/2019 | Zhang | H04B 7/0408 |
| 2019/0141742 | A1* | 5/2019 | Zhou | H04B 7/02 |
| 2019/0372806 | A1* | 12/2019 | Park | H04W 52/14 |
| 2019/0387554 | A1* | 12/2019 | Guo | H04W 72/046 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 14)," 3GPP TS 36.212 V14.1.0, Dec. 2016, 176 pages.

"3rd Generation Partnership Project; Technical Specification Group Radio Access Network; Evolved Universal Terrestrial Radio Access (E-UTRA); Physical Layer Procedures (Release 14)," 3GPP TS 36.213 V14.1.0, Dec. 2016, 414 pages.

"3rd Generation Partnership Project; Technical Specification Group Radio Access Network; Evolved Universal Terrestrial Radio Access (E-UTRA); Medium Access Control (MAC) Protocol Specification (Release 14)," 3GPP TS 36.321 V14.1.0, Dec. 2016, 98 pages.

"3rd Generation Partnership Project; Technical Specification Group Radio Access Network; Evolved Universal Terrestrial Radio Access (E-UTRA); Radio Resource Control (RRC) Protocol Specification (Release 14)," 3GPP TS 36.331 V14.1.0, Dec. 2016, 654 pages.

"3rd Generation Partnership Project; Technical Specification Group Services and System Aspects; Feasibility Study on New Services and Markets Technology Enablers; Stage 1 (Release 14)," 3GPP TR 22.891 V1.2.0, Nov. 2015, 96 pages.

"3rd Generation Partnership Project; Technical Specification Group Radio Access Network; Study on New Radio (NR) Access Technology Physical Layer Aspects," 3GPP TR 38.802 V1.1.0, Jan. 2017, 71 pages.

"3rd Generation Partnership Project; Technical Specification Group Radio Access Network; NR; Physical Channels and Modulation (Release 15)," 3GPP TS 38.211 V15.0.0, Dec. 2017, 73 pages.

"3rd Generation Partnership Project; Technical Specification Group Radio Access Network; NR; Multiplexing and Channel Coding (Release 15)," 3GPP TS 38.212 V15.0.0, Dec. 2017, 82 pages.

"3rd Generation Partnership Project; Technical Specification Group Radio Access Network; NR; Physical Layer Procedures for Control (Release 15)," 3GPP TS 38.213 V15.0.0, Dec. 2017, 56 pages.

"3rd Generation Partnership Project; Technical Specification Group Radio Access Network; NR; Physical Layer Procedures for Data (Release 15)," 3GPP TS 38.214 V15.0.0, Dec. 2017, 71 pages.

"3rd Generation Partnership Project; Technical Specification Group Radio Access Network; NR; Medium Access control (MAC) Protocol Specification (Release 15)," 3GPP TS 38.321 V15.0.0, Dec. 2017, 55 pages.

"3rd Generation Partnership Project; Technical Specification Group Radio Access Network; NR; Radio Resource control (RRC) Protocol Specification (Release 15)," 3GPP TS 38.331 V15.0.0, Dec. 2017, 188 pages.

Samsung, "Discussion on beam indication for UL transmission", 3GPP TSG RAN WG1 Meeting 90bis, Oct. 9-13, 2017, 6 pages, R1-1717620.

ASUSTeK, "Discussion on UL Beam Management", 3GPP TSG RAN WG1 Meeting 90bis, Oct. 9-13, 2017, 4 pages, R1-1717897.

AT&T, "Beam Measurement and Reporting", 3GPP TSG RAN WG1 Meeting 90bis, Oct. 9-13, 2017, 5 pages, R1-1718388.

International Search Report dated Feb. 14, 2019 in connection with International Patent Application No. PCT/KR2018/013480, 3 pages.

* cited by examiner

METHOD AND APPARATUS FOR BEAM MANAGEMENT IN THE UNLICENSED SPECTRUM

CROSS-REFERENCE TO RELATED APPLICATION(S) AND CLAIM OF PRIORITY

The present application claims priority to:
U.S. Provisional Patent Application Ser. No. 62/583,144, filed on Nov. 8, 2017;
U.S. Provisional Patent Application Ser. No. 62/598,203, filed on Dec. 13, 2017;
U.S. Provisional Patent Application Ser. No. 62/616,825, filed on Jan. 12, 2018;
U.S. Provisional Patent Application Ser. No. 62/621,210, filed on Jan. 24, 2018;
U.S. Provisional Patent Application Ser. No. 62/626,948, filed on Feb. 6, 2018;
U.S. Provisional Patent Application Ser. No. 62/626,970, filed on Feb. 6, 2018;
U.S. Provisional Patent Application Ser. No. 62/634,998, filed on Feb. 26, 2018;
U.S. Provisional Patent Application Ser. No. 62/652,668, filed on Apr. 4, 2018;
U.S. Provisional Patent Application Ser. No. 62/658,008, filed on Apr. 16, 2018;
U.S. Provisional Patent Application Ser. No. 62/659,363, filed on Apr. 18, 2018;
U.S. Provisional Patent Application Ser. No. 62/674,676, filed on May 22, 2018; and
U.S. Provisional Patent Application Ser. No. 62/725,776, filed on Aug. 31, 2018.
The content of the above-identified patent documents are incorporated herein by reference.

TECHNICAL FIELD

The present application relates generally to beam management. More specifically, this disclosure relates to beam management in the unlicensed spectrum.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide beam management scheme in the unlicensed spectrum.

In one embodiment, a user equipment (UE) in a wireless communication system is provided. The UE comprises a transceiver configured to receive, from a base station (BS), configuration information identifying a set of physical uplink control channel (PUCCH) resources, wherein each of the set of PUCCH resources is identified via an identifier (ID) and information associated with a transmit (Tx) beam, and receive, from the BS, a downlink control information (DCI) format to schedule a transmission over a physical uplink shared channel (PUSCH). The UE further comprises a processor operably connected to the transceiver, the processor is configured to identify scheduling information for the transmission over the PUSCH based on the DCI format, and configure a Tx beam for the PUSCH based on the configuration information for the set of PUCCH resources. The transceiver is further configured to transmit, to the BS, data over the PUSCH based on the scheduling information using the Tx beam.

In another embodiment, a base station (BS) in a wireless communication system is provided. The BS comprises a processor configured to identify a transmit (Tx) beam from a user equipment (UE) based on configuration information for each physical uplink control channel (PUCCH) resource in a set of PUCCH resources. The BS further comprises a transceiver operably connected to the processor, the transceiver configured to transmit, to a UE, the system configuration information identifying the set of PUCCH resources, wherein each of the set of PUCCH resources is identified via an identifier (ID) and information associated with the Tx beam, transmit, to the UE, scheduling information including a DCI format to schedule the UE with a transmission over a physical uplink shared channel (PUSCH), and receive, from the UE, data over the PUSCH based on the scheduling information using an receive (Rx) beam that corresponds to the Tx beam applied to a transmission over the PUSCH by the UE.

In yet another embodiment, a method of a user equipment (UE) in a wireless communication system is provided. The method comprises receiving, from a base station (BS), configuration information identifying a set of physical uplink control channel (PUCCH) resources, wherein each of the set of PUCCH resources is identified via an identifier (ID) and information associated with a transmit (Tx) beam, receiving, from the BS, a downlink control information (DCI) format to schedule a transmission over a physical uplink shared channel (PUSCH), identifying scheduling information for the transmission over the PUSCH based on the DCI format, configuring a Tx beam for the PUSCH based on the configuration information for the set of PUCCH resources, and transmitting, to the BS, data over the PUSCH based on the scheduling information using the Tx beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
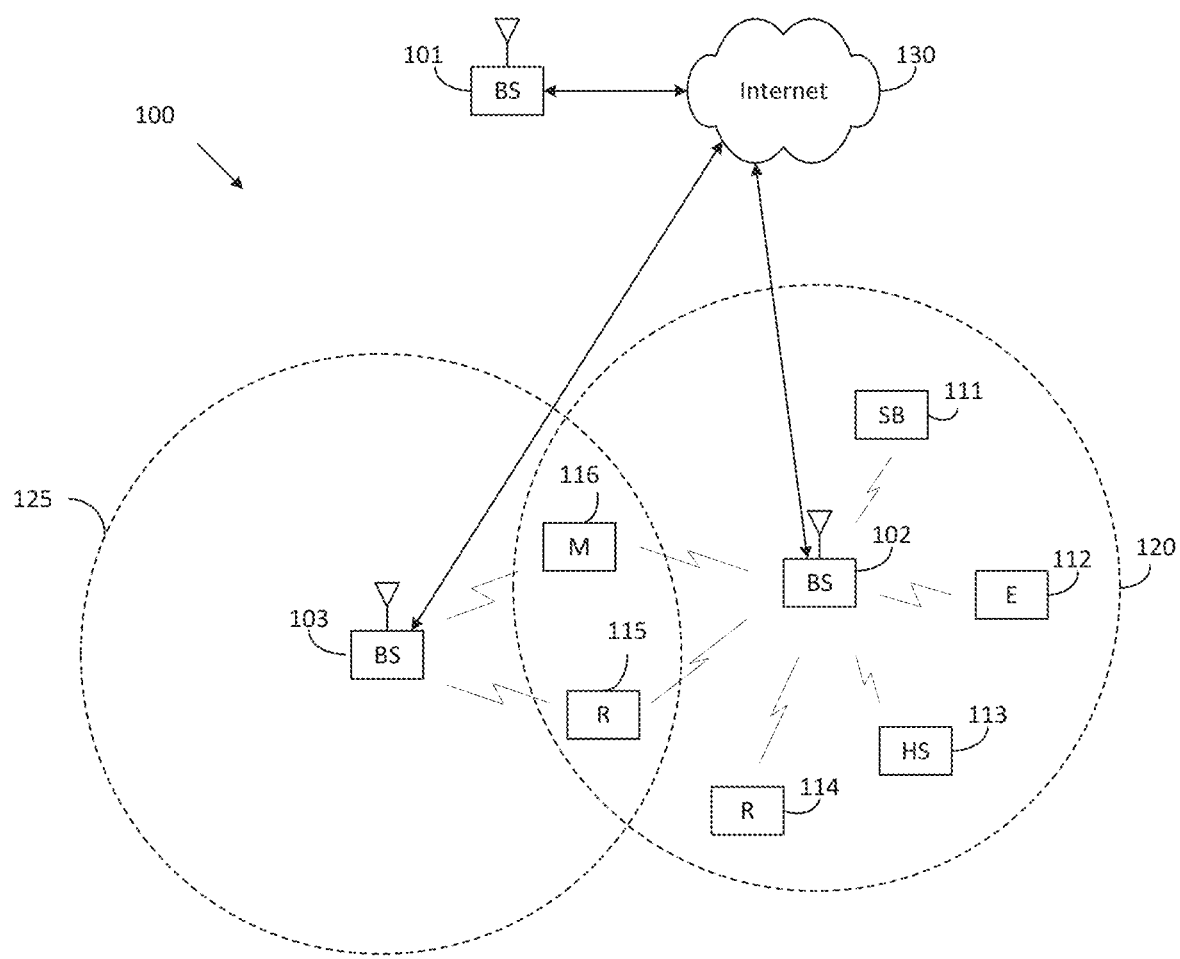
FIG. 1 illustrates an example wireless network according to embodiments of the present disclosure.

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.1.0, "E-UTRA, Physical channels and modulation;" 3GPP TS 36.212 v14.1.0, "E-UTRA, Multiplexing and Channel coding;" 3GPP TS 36.213 v14.1.0, "E-UTRA, Physical Layer Procedures;" 3GPP TS 36.321 v14.1.0, "E-UTRA, Medium Access Control (MAC) protocol specification;" and 3GPP TS 36.331 v14.1.0, "E-UTRA, Radio Resource Control (RRC) protocol specification," 3GPP TR 22.891 v1.2.0, "Feasibility Study on New Services and Markets Technology Enablers," 3GPP TR 38.802 v1.1.0, "Technical Specification Group Radio Access Network; Study on New Radio Access Technology Physical Layer Aspects;" 3GPP TS 38.214 v15.0.0, "NR, Physical Layer Procedures for Data;" 3GPP TS 38.211 v15.0.0, "NR, Physical channels and modulation;" 3GPP TS 38.212 v15.0.0, "NR, Multiplexing and Channel coding;" 3GPP TS 38.213 v15.0.0, "NR, Physical layer procedures for control;" 3GPP TS 38.321 v15.0.0, "NR, Medium Access Control (MAC) protocol specification;" and 3GPP TS 38.331 v15.0.0, "NR, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
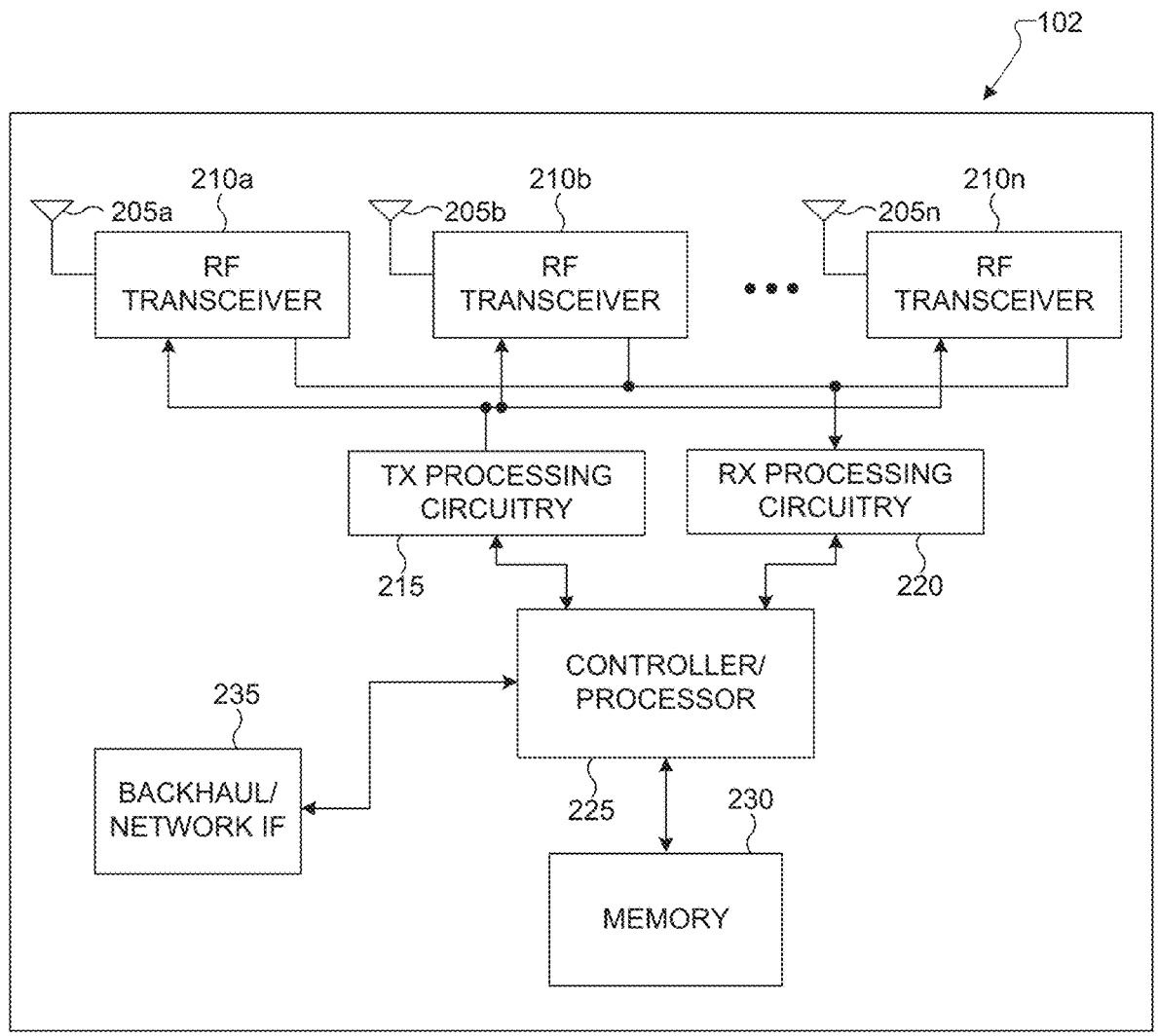
FIG. 2 illustrates an example eNB according to embodiments of the present disclosure.
Figure 3:
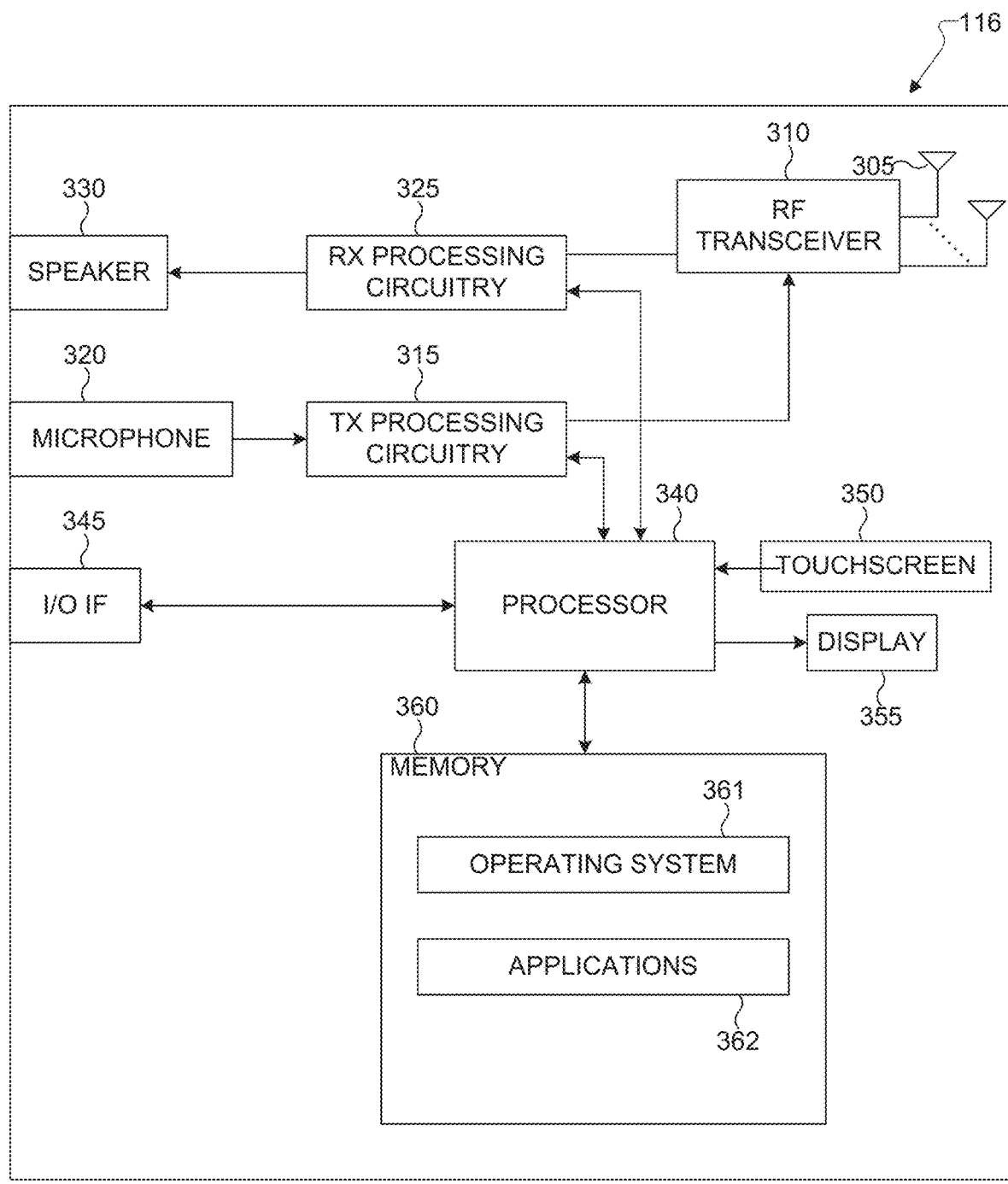
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient beam management in an advanced wireless communication system. In certain embodiments, and one or more of the eNBs 101-103 includes circuitry, programming, or a combination thereof, for efficient beam management in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
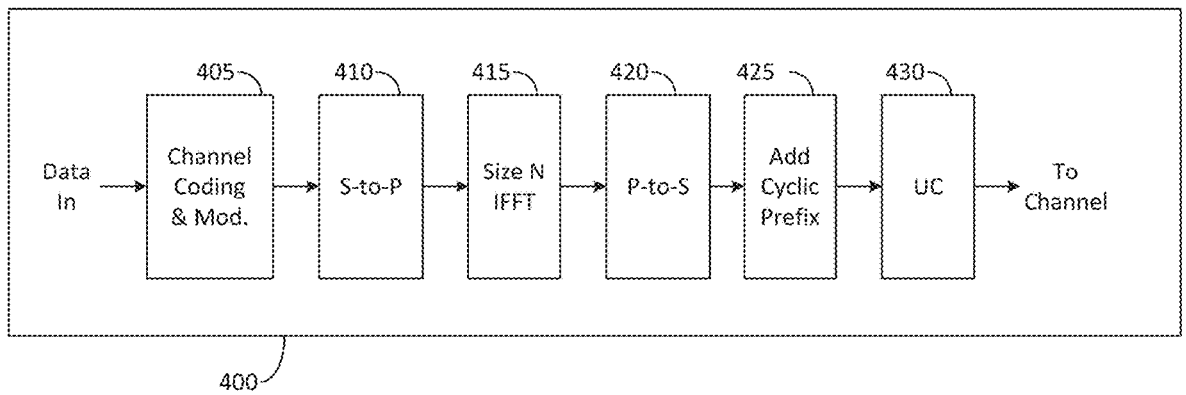
FIG. 4A illustrates a high-level diagram of an orthogonal frequency division multiple access transmit path according to embodiments of the present disclosure.
Figure 4B:
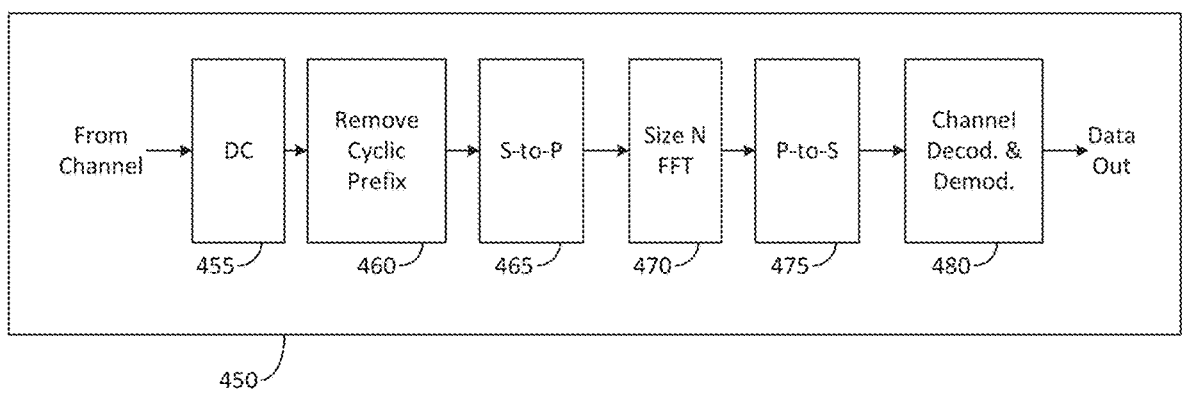
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
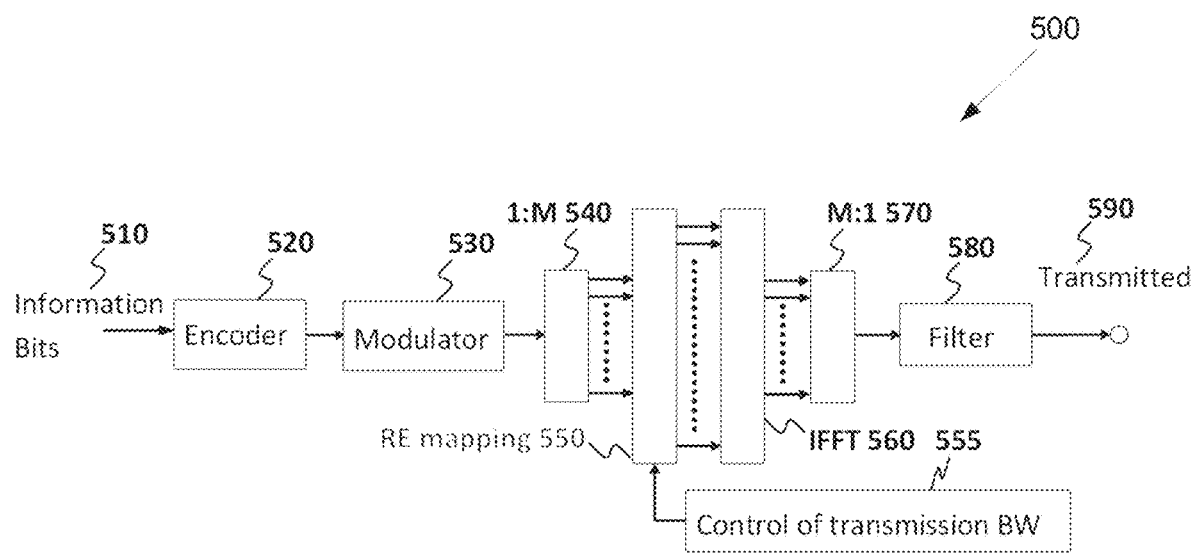
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
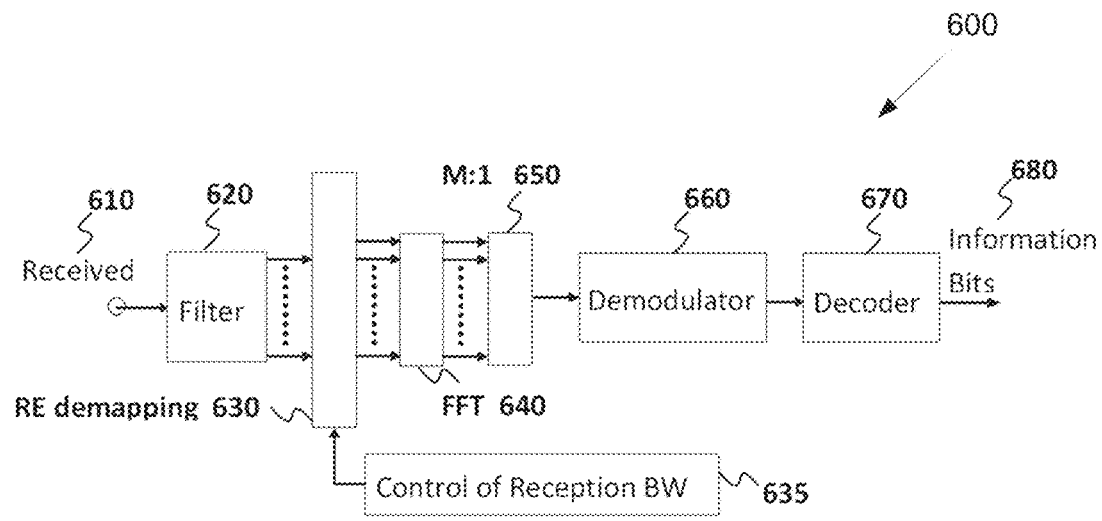
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallelto-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
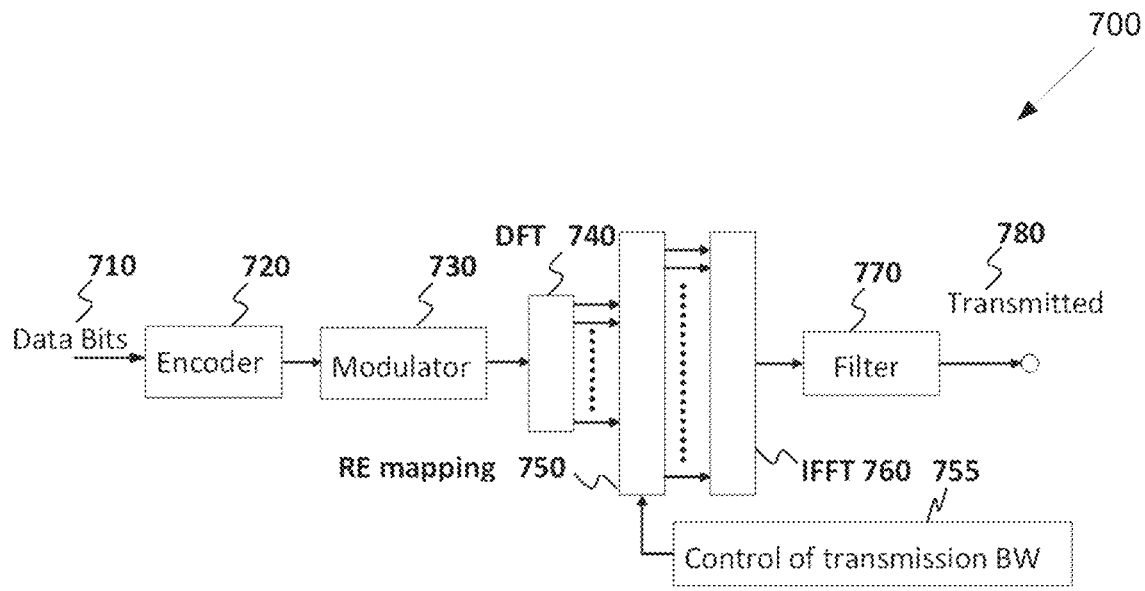
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
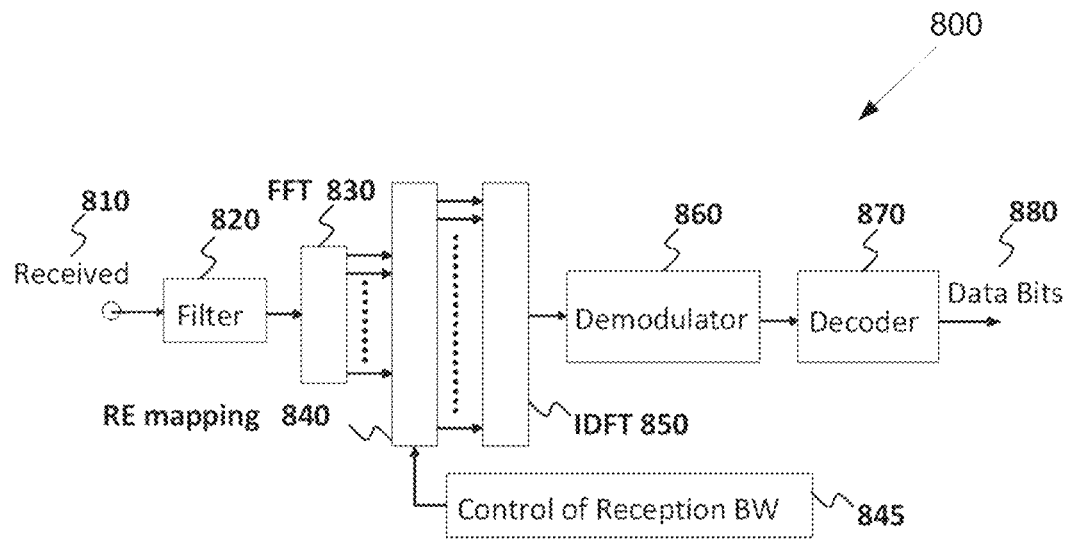
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
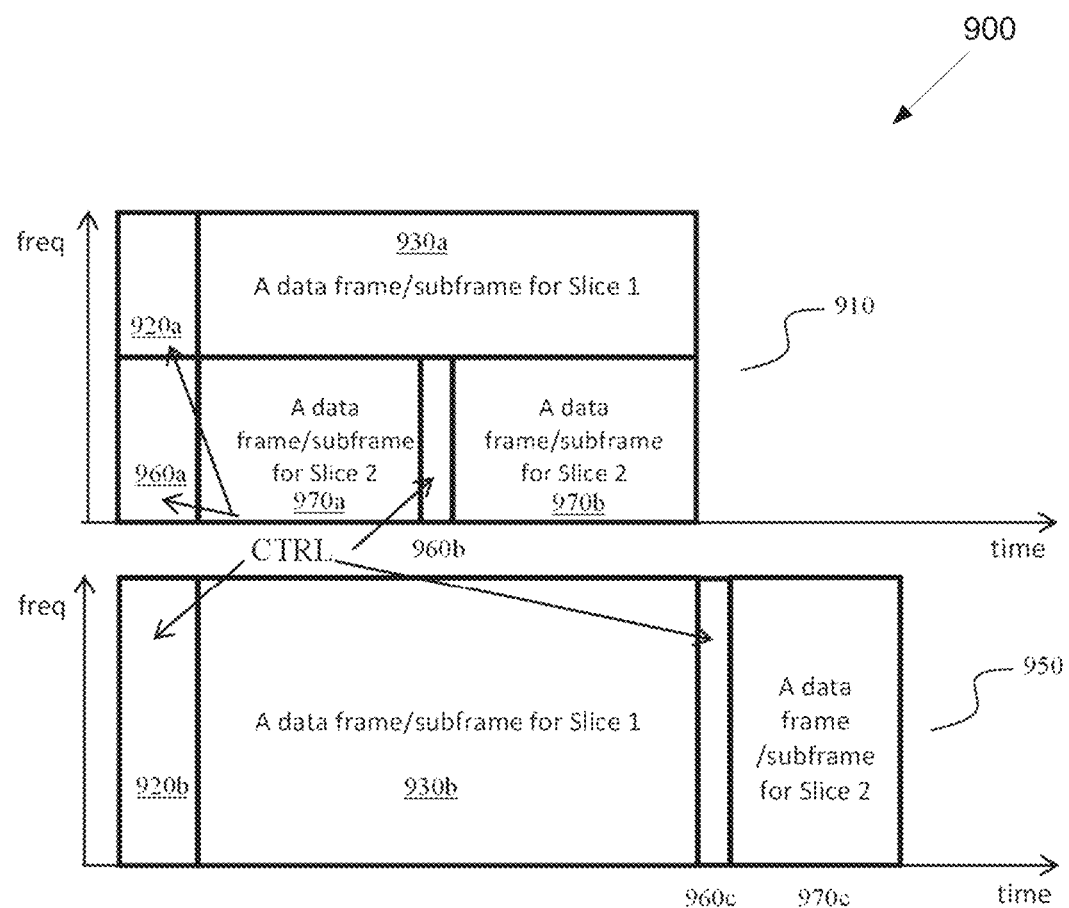
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In diagram 910, the two slices are multiplexed in frequency domain whereas in diagram 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
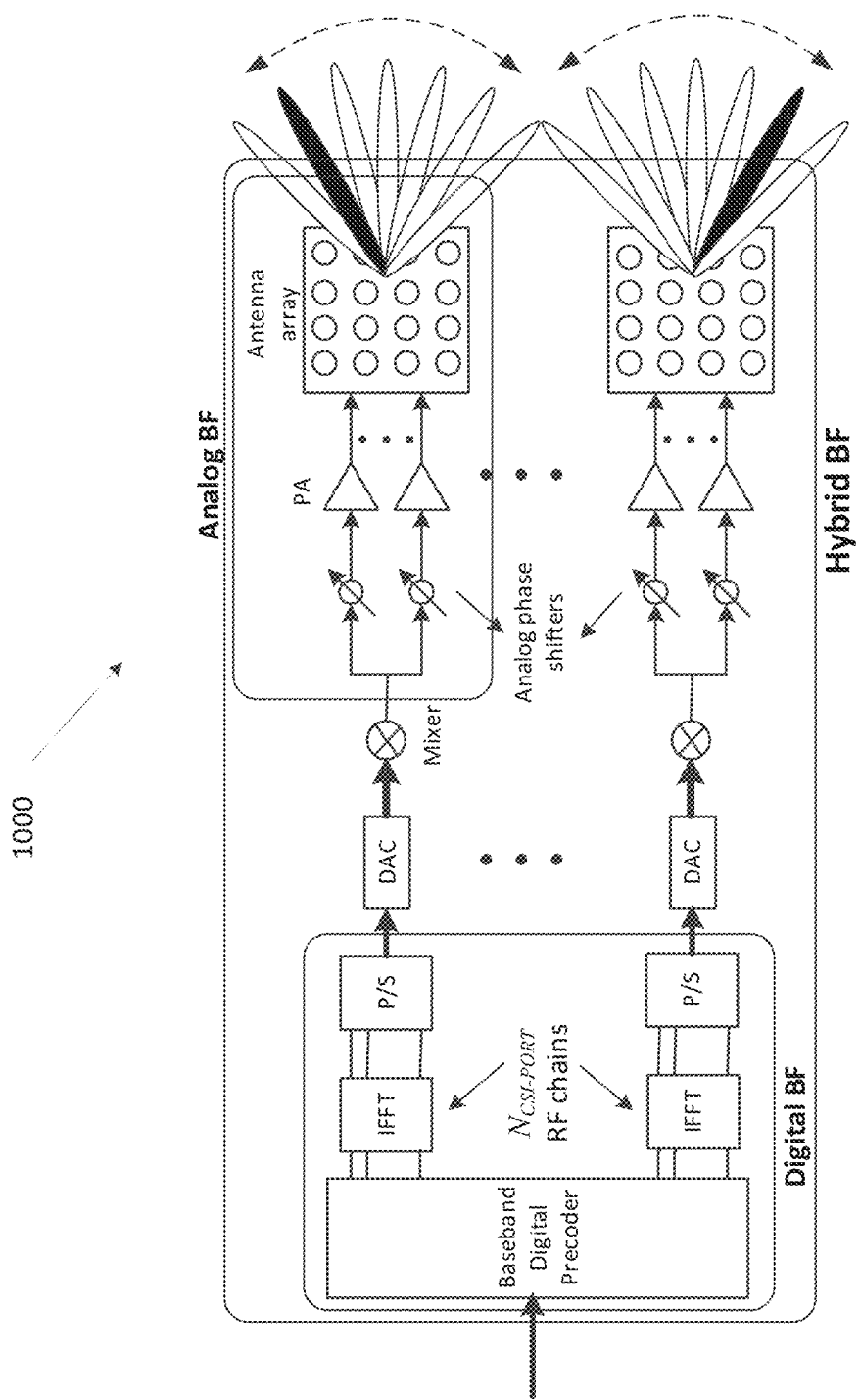
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In LTE, a number of CSI reporting modes exist for both periodic (PUCCH-based) and aperiodic (PUSCH-based) CSI reporting. Each CSI reporting mode is depend on (coupled with) many other parameters (e.g. codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as its DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

Figure 11:
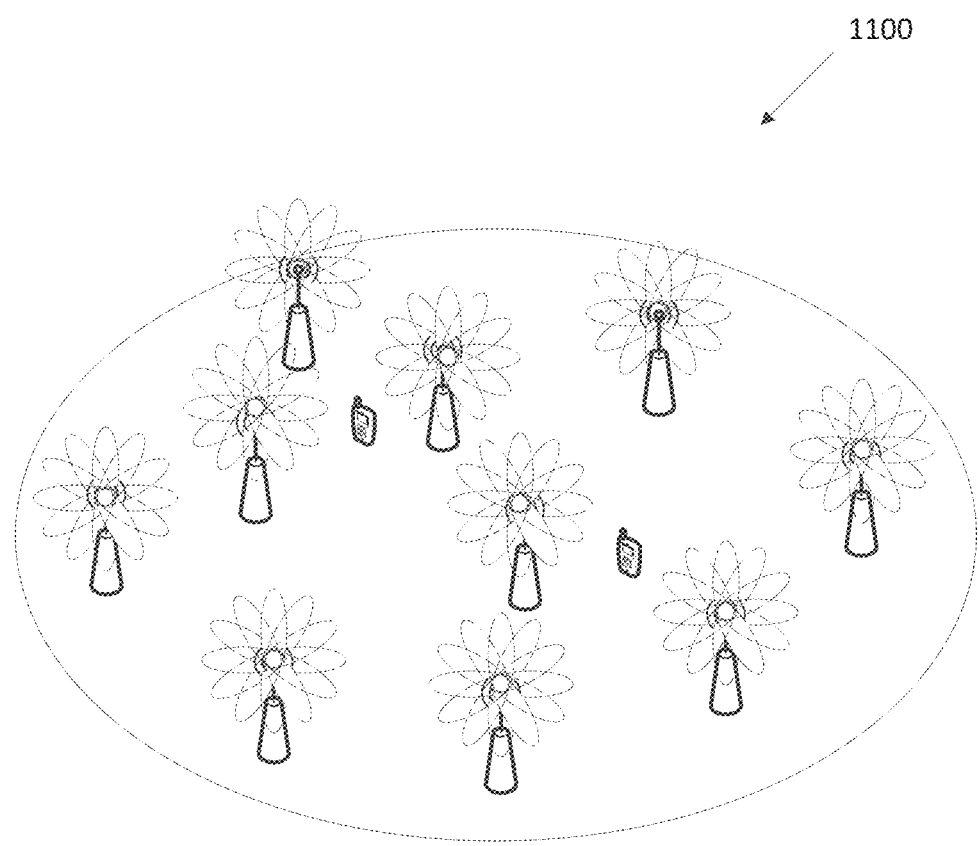
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

The 5G system is generally a multi-beam based system. In such a system, multiple beams are used to cover one coverage area. An example for illustration is shown in FIG. 11. As shown in FIG. 11, one gNB has one or more TRPs. Each TRP uses one or more analog beams to cover some area. To cover one UE in one particular area, the gNB use one or more analog beams to transmit and receive the signal to and from that UE. The gNB and the UE need to determine the beam(s) used for their connection. When the UE moves within one cell coverage area, the beam(s) used for this UE may be changed and switched.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

In NR, the following L1/L2 beam management procedures are supported in NR. In one example of P-1, the beam management is used to enable UE measurement on different TRP Tx beams to support selection of TRP Tx beams/UE Rx beam(s). In this example, for beamforming at TRP, the beamforming typically includes an intra/inter-TRP Tx beam sweep from a set of different beams. For beamforming at UE, the beamforming typically includes a UE Rx beam sweep from a set of different beams. In one example of P-2, the beam management is used to enable UE measurement on different TRP Tx beams to possibly change inter/intra-TRP Tx beam(s) from a possibly smaller set of beams for beam refinement than in P-1. Note that P-2 can be a special case of P-1. In one example of P-3, the beam management is used to enable UE measurement on the same TRP Tx beam to change UE Rx beam in the case UE uses beamforming In the present disclosure, a "beam" can correspond to an RS resource, whether the beam is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So a hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

In the classical channel access for unlicensed spectrum, e.g. on 5 GHz band, omni-directional clear channel assessment (CCA) based listen-before-talk (LBT) is mandatory before occupying the channel. However, the same channel access procedure may not be effective or efficient for multibeam operation system, e.g. on 60 GHz unlicensed band or multi-beam 5 GHz band. For example, in licensed assistant access (LAA) downlink, UEs within the same cell share the same LBT parameters including the contention window size (CWS), which is unfair among UEs with different transmission capabilities and channel conditions. To solve this issue, directional LBT, possibly combined with omni-directional LBT, based channel access framework is provided in the present disclosure.

Multi-beam operation system can support one or multiple of the following types of direction LBT schemes on the licensed spectrum. Assume the LBT is associated with one or multiple sensing directions $D_1, \ldots, D_M$, where M≥1, and each sensing direction can cover one or multiple receivers. Note that omni-directional LBT can also be considered as a special case of single direction (M=1). The following two types of LBT are considered.

In one example of type A, sense the channel for a sensing interval $T_{d,A}$, which consists of a duration $T_f$ (no sensing in this duration) immediately followed by one or more CCA slots (where the number of CCA slots is predefined or configured, and each slot with duration $T_{slot}$, and directional/omni-directional CCA is performed in the slots). If there are more than one CCA slots, each of the slots senses all directions $D_1, \ldots, D_M$, and the configuration of directions (number of sensing durations, and directions to sense within each duration) within each CCA slots can be common or different. Type A LBT is considered to be completed for all receivers/directions sensed in this LBT, if all the sensing slots are detected to be idle for all receivers/directions sensed in this LBT. Type A LBT is considered to be completed for some particular receivers/directions sensed in this LBT, if all the sensing slots are detected to be idle for those particular receivers/directions sensed in this LBT.

In another example of Type B, sense the channel for a sensing interval $T_{d,B}$, which consists of a duration $T_f$ (no sensing in this duration) immediately followed by one or more CCA slots (each with duration $T_{slot}$, and directional/omni-directional CCA is performed in the slots), and if the sensing interval $T_{d,B}$ is detected to be idle, continue sensing the channel for a series of CCA slots (the number of sensing slots following is also known as the backoff counter). Each of the slots (including the slots in $T_{d,B}$ and slots following $T_{d,B}$) senses all directions $D_1, \ldots, D_M$, and the configuration of directions (number of sensing durations, and directions to sense within each duration) within each CCA slots can be common or different. Type B LBT is considered to be completed for all receivers/directions sensed in this LBT, if all the sensing slots are detected to be idle for all receivers/directions sensed in this LBT. Type B LBT is considered to be completed for some particular receivers/directions sensed in this LBT, if all the sensing slots are detected to be idle for those particular receivers/directions sensed in this LBT.

The generation of backoff counter can be based on one or multiple of the following embodiments.

In one embodiment, for every sensing direction or group of directions $D_m$, the transmitter generates and maintains a backoff counter $N_m$ (in this sense, backoff counter is direction-specific/group-of-direction-specific or equivalently, receiver or group-of-receiver specific), where $N_m$ is initialized as a random integer uniformly generated between 0 and the contention window size CW (in this sense, contention window size is common for all directions/receivers), and $N_m = N_m - 1$ if the CCA slot is detected to be idle on direction or group of directions m.

In another embodiment, for every sensing direction or group of directions $D_m$, the transmitter generates and maintains a backoff counter $N_m$ (in this sense, backoff counter is direction-specific/group-of-direction-specific or equivalently, receiver or group-of-receiver specific), where $N_m$ is initialized as a random integer uniformly generated between 0 and the contention window size $CW_m$ (in this sense, contention window size is direction-specific/group-of-direction-specific or equivalently, receiver or group-of-receiver specific), and $N_m=N_m-1$ if the CCA slot is detected to be idle on direction or group of directions m.

In another embodiment, the transmitter generates and maintains a common backoff counter N (in this sense, backoff counter is common for all directions/receivers), where N is initialized as a random integer uniformly generated between 0 and the contention window size CW (in this sense, contention window size is common for all directions/receivers), and N=N−1 if the CCA slot is detected to be idle for all sensed directions.

In another embodiment, the transmitter generates and maintains a common backoff counter N (in this sense, backoff counter is common for all directions/receivers), where N is initialized as a random integer uniformly generated between 0 and a value $\overline{CW}$, and $\overline{CW}$ is calculated from contention window sizes $CW_1, \ldots, CW_M$ (in this sense, contention window size is direction-specific/group-of-direction-specific or equivalently, receiver or group-of-receiver specific), and N=N−1 if the CCA slot is detected to be idle for all sensed directions. Note that in one example, $CW_1, \ldots, CW_M$ can be the same for all directions, which means all directions utilize the same contention window size.

The adjustment of contention window size(s) can be based on one or multiple of the following schemes. In one example, the common contention window size is fixed. In one example, the direction-specific/group-of-direction-specific contention window size is fixed for each direction or group of directions. In one example, the common contention window size $\overline{CW}$ is maintained at the transmitter side, and is adjusted from a set of predefined values using the following steps: initialize as the minimum predefined value $\overline{CW}_{min}$; and increase to the next higher predefined value if the transmitter chooses to increase (if the maximum predefined value $\overline{CW}_{max}$ is achieved, remain the same value); otherwise, reset to the minimum predefined value $\overline{CW}_{min}$.

In one example, the direction-specific/group-of-direction-specific contention window size $CW_m$ is maintained at the transmitter side, and is adjusted from a set of direction-specific predefined values using the following steps (minimum and maximum predefined values can be different across directions): initialize as the minimum predefined value $CW_{m,min}$; and increase to the next higher predefined value if the transmitter chooses to increase (if the maximum predefined value $CW_{m,max}$ is achieved, remain the same value); otherwise, reset to the minimum predefined value $CW_{m,min}$.

In one example, the direction-specific/group-of-direction-specific contention window size $CW_m$ is maintained at the receiver side, and is adjusted from a set of direction-specific predefined values using the following steps (minimum and maximum predefined values can be different across directions): initialize as the minimum predefined value $CW_{m,min}$; and increase to the next higher predefined value if the receiver chooses to increase (if the maximum predefined value $CW_{m,max}$ is achieved, remain the same value); otherwise, reset to the minimum predefined value $CW_{m,min}$.

In the present disclosure, the embodiments of CSI-RS for beam management for NR unlicensed spectrum are provided.

In one embodiment, one transmitter can be configured to operate directional LBT before one CSI-RS transmission. The transmitter can be configured to operate beamforming based directional LBT on one or more beamforming directions or Omni-directional LBT, and if the sensed direction is clear (e.g. corresponding LBT procedure completes), the transmitter can transmit the configured CSI-RS resources. The transmitter can be configured to choose beamforming based directional LBT configuration according to the beamforming directions that are going to be applied to the CSI-RS transmission to be transmitted. The transmitter can be configured to choose beamforming based directional LBT configuration according to the beam sweeping configuration of CSI-RS resources in the CSI-RS transmission to be transmitted. In one embodiment, the transmitter can be configured to transmit CSI-RS without doing LBT.

Figure 12:
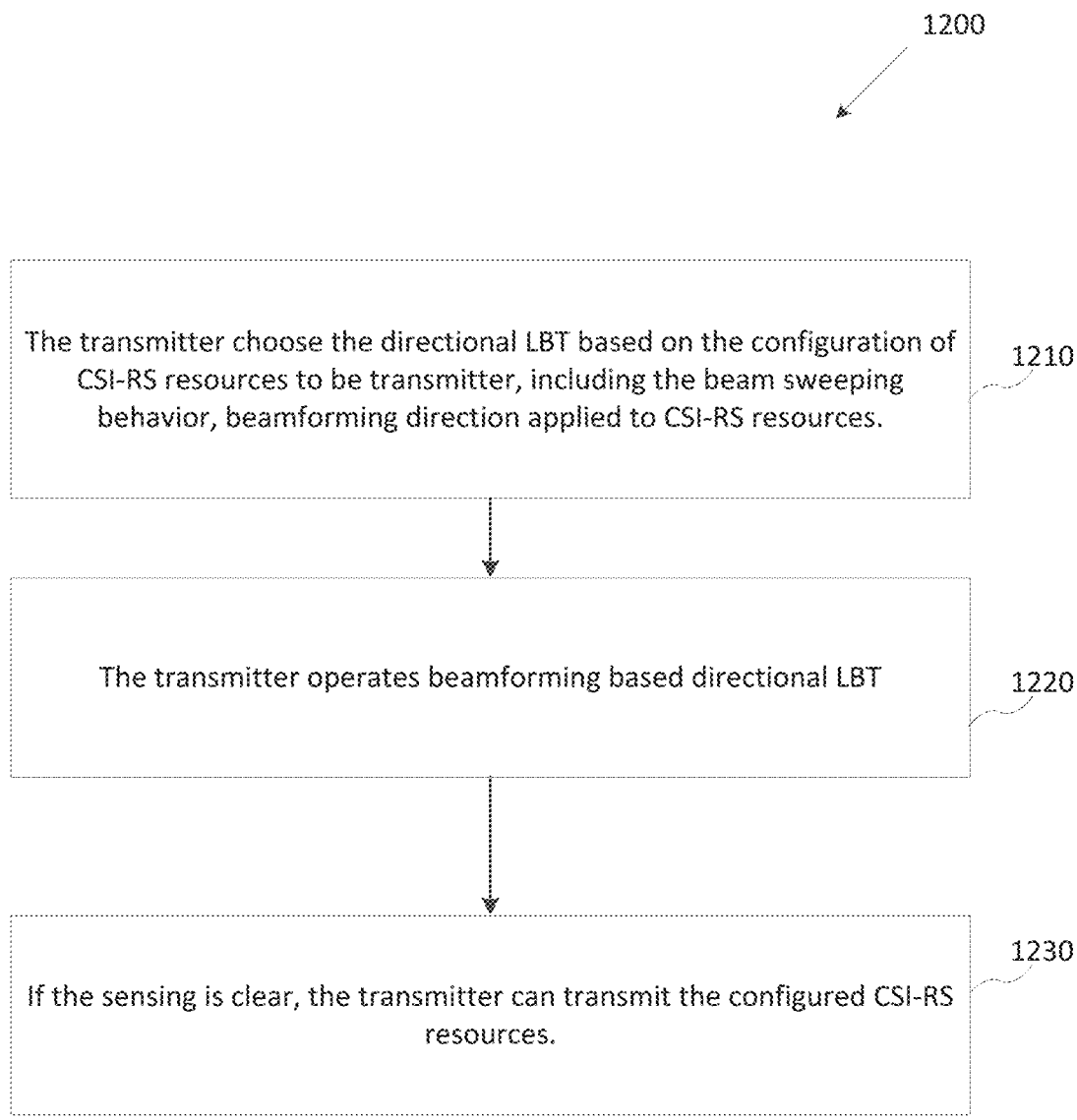
FIG. 12 illustrates a flow chart of a procedure of transmission of CSI-RS resources according to embodiments of the present disclosure.

FIG. 12 illustrates a flow chart of a procedure 1200 of transmission of CSI-RS resources according to embodiments of the present disclosure. The embodiment of the procedure 1200 illustrated in FIG. 12 is for illustration only. FIG. 12 does not limit the scope of this disclosure to any particular implementation.

A transmitter is configured to transmit one or more CSI-RS resources. The transmitter first chooses one directional LBT configuration based on the configuration of the CSI-RS resources to be transmitted in 1210. The configuration of CSI-RS resources can include the beam sweeping behavior, whether same Tx beam(s) is repeated or not across CSI-RS resources, and the beam directions to be applied to the CSI-RS resources. In 1220, the transmitter operates the selected beamforming based directional LBT. If the sensing is clear, the transmitter can transmit the CSI-RS resources in 1230.

In one embodiment, the CSI-RS can be multiplexed with data transmission and/or other signal transmission (for example discovery signal) and the LBT for data transmission and/or other signal transmission can be re-used for CSI-RS transmission.

In one embodiment, one transmitter can be configured with a set of CSI-RS resources and there are N≥1 CSI-RS resources in that set. An information element can be configured to indicate whether Tx beam repetition is "on/off" for the CSI-RS resources within that CSI-RS resource set. If the repetition is "On," the receiver can assume that the transmitter maintains a fixed Tx beam across the CSI-RS resources in that set. The transmitter can be configured to operate a beamforming based directional LBT to sense the channel before the transmission of CSI-RS resource with Tx beam repetition "On." In one example, the transmitter can first operate a directional LBT with the beamforming direction being same to the beam direction of the Tx beam that is going to be applied on the CSI-RS resources to be transmitted and if the sensing is clear, the transmitter can transmit the scheduled CSI-RS resources.

In one embodiment, one transmitter can be configured with a set of CSI-RS resources and there are N≥1 CSI-RS resources in that set. An information element can be configured to indicate whether Tx beam repetition is "on/off" for the CSI-RS resources within that CSI-RS resource set. If the repetition is "On," the receiver can assume that the transmitter maintains a fixed Tx beam across the CSI-RS resources in that set. If the beam correspondence is not hold at the transmitter side, the transmitter can be configured to operate directional LBT with multiple beamforming directions that may be able to cover the beam direction of the Tx beam that is going to be applied on the CSI-RS resources to be transmitted.

If the sensing is clean, the transmitter can transmit the scheduled CSI-RS resources. If the beam correspondence is hold at the transmitter side, the transmitter can be configured to operate directional LBT with the beamforming direction that is same to the Tx beamforming direction that is going to be applied on the CSI-RS resources to be transmitted. If the sensing is clear, the transmitter can transmit the scheduled CSI-RS resources.

In one embodiment, one transmitter can be configured with a set of CSI-RS resources and there are $N \geq 1$ CSI-RS resources in that set. An information element can be configured to indicate whether Tx beam repetition is "on/off" for the CSI-RS resources within that CSI-RS resource set. If the repetition is "Off," the receiver can assume that the transmitter does not maintain a fixed Tx beam across the CSI-RS resources in that set. In other words, the transmitter can apply different Tx beamforming on different CSI-RS resources in that set. The transmitter can be configured to operate a beamforming based directional LBT to sense the channel before the transmission of CSI-RS resource with Tx beam repetition "Off." In one example, the transmitter can first operate a directional LBT with the beamforming directions being same to the N different beam directions of the Tx beams that is going to be applied on the CSI-RS resources to be transmitted and if the sensing is clear, the transmitter can transmit the scheduled CSI-RS resources.

In one example, the transmitter can use directional LBT to sense $K \geq 1$ beamforming directions and those K beamforming directions may be able to cover the direction of those Tx beams that are going to be applied to N CSI-RS resources to be transmitted. K can be less than N, equal to N or larger than N. The transmitter transmits those CSI-RS resources only if the sensing on all K beamforming directions is clear. If the sensing on one or more of those K beamforming directions is not clear, the transmitter does not transmit any of those N CSI-RS resources. This embodiment is useful to ensure proper beam measurement and reporting in unlicensed band system. The UE can be configured to measure N CSI-RS resources by assuming different Tx beams are applied on those CSI-RS resources and then report a few selected "best" beams.

If the sensing on some beamforming direction(s) is not clear and if the transmitter only transmits the CSI-RS resources of those beamforming directions with cleared sensing, then the receiver would be able to measure only partial of the Tx beams but the receiver does not know which CSI-RS resource(s) is not transmitted. That would results in inaccurate beam measurement and reporting.

Figure 13:
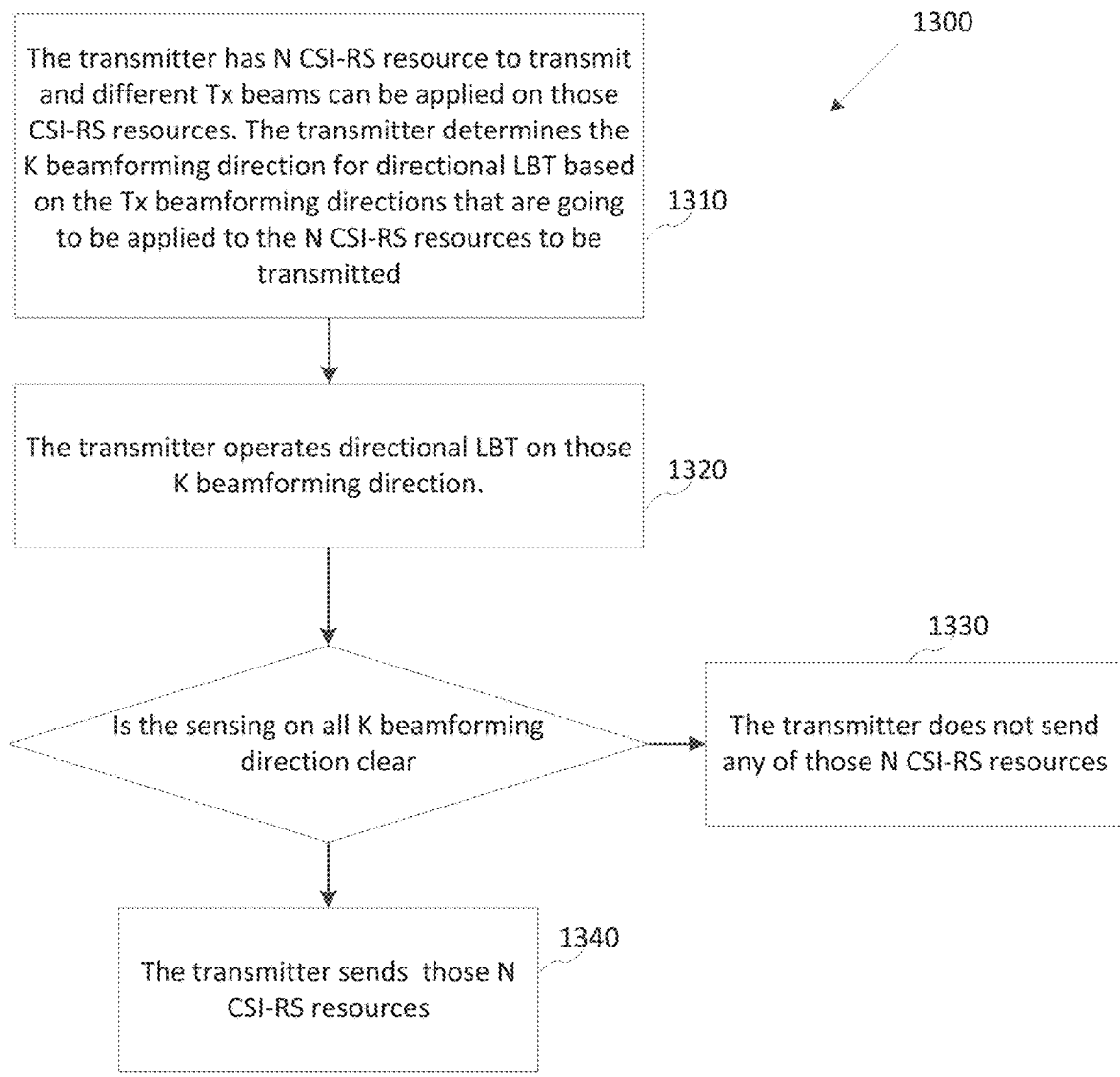
FIG. 13 illustrates a flow chart of another procedure of transmission of CSI-RS resources according to embodiments of the present disclosure.

FIG. 13 illustrates a flow chart of another procedure 1300 of transmission of CSI-RS resources according to embodiments of the present disclosure. The embodiment of the procedure 1300 illustrated in FIG. 13 is for illustration only. FIG. 13 does not limit the scope of this disclosure to any particular implementation.

The transmitter has N CSI-RS resources to transmit. The Tx beam repetition configuration of those CSI-RS resources is "Off." So the transmitter can apply N different Tx beams on those CSI-RS resources. The transmitter can determine K beamforming directions for directional LBT according to the Tx beams to be applied to those N CSI-RS resource in 1310. The transmitter can operate directional LBT on those K selected beamforming direction 1320. If the sensing on all K selected beamforming direction is clear, the transmitter can transmit those N CSI-RS resources in 1340. If the sensing on one or more of those K selected beamforming direction is not clear, the transmitter can discard the transmission of all those N CSI-RS resources in 1330.

In one embodiment, one transmitter can be configured with a set of CSI-RS resources and there are $N \geq 1$ CSI-RS resources in that set. The information element of Tx beam repetition is configured to be "On" or "Off." The transmitter can be configured to select the Type A and Type B directional LBT based on the number of CSI-RS resources and/or the total length of transmission duration of the CSI-RS resource to be transmitted. If the total transmission duration is less than a threshold value, the transmitter may operate a Type A LBT. If the total transmission duration of the CSI-RS resources is larger than a threshold value, the transmitter may operate a Type B LBT.

In some embodiments, the transmitter can be configured to operate directional LBT with multiple beamforming directions and sense those beamforming directions on the same symbol(s). In one embodiment, the transmitter can be configured to transmit N CSI-RS resources and those N CSI-RS resources are FDMed onto the same symbol(s). The transmitter can apply different Tx beam on those CSI-RS resources. One example of the scenarios is the transmitter has N transmit panels and the transmitter can transmit from those panels simultaneously on the same symbol. The transmitter can transmit one CSI-RS resource from each of the Tx panel and one analog beam can be applied to one CSI-RS resource.

The transmitter can be configured to operate directional LBT with the beamforming directions corresponding to the Tx beams that are applied to those N CSI-RS resources and the transmitter can sense those beamforming directions simultaneously on the same symbol(s). With sensing results, the transmitter can do one of the following.

In one example, if the sensing of a first beamforming direction is clear, the transmitter can transmit the CSI-RS resource whose Tx beam corresponds to a first beamforming direction. If the sensing of a second beamforming direction is not clear, the transmitter cannot transmit the CSI-RS resource whose Tx beam corresponds to a second beamforming direction.

In another example, if the sensing of all sensed beamforming direction is clear, the transmitter can transmit all N CSI-RS resource. If the sensing of some of the sensed beamforming direction is not clear, the transmitter cannot transmit any of the N CSI-RS resources.

The gNB can be configured to transmit N 1 aperiodic CSI-RS resources for a beam management. Different or same Tx beams can be applied to those N aperiodic CSI-RS resources. A DCI in PDCCH can be used to trigger the transmission of N aperiodic CSI-RS resources. The receiver or the UE decodes the DCI to obtain the trigger information and then the receiver or the UE can receive the triggered N aperiodic CSI-RS resources. In some embodiment, the transmitter can be configured to operate directional LBT to sense on the beamforming directions for a first PDCCH and the N aperiodic CSI-RS resources triggered by DCI sent in a first PDCCH.

If the sensing on all the beamforming directions corresponding to the transmit beams of a first PDCCH and the N CSI-RS resources to be triggered is clear, the transmitter can transmit a first PDCCH and the N aperiodic CSI-RS resources triggered by the DCI in a first PDCCH. In one example, if the sensing of some of the beamforming directions is not clear, the transmitter can be not transmit a first PDCCH and the N aperiodic CSI-RS resources. In one example, if the sensing of beamforming direction corresponding to a first PDCCH is clear but the sensing of some of beamforming directions corresponding to those N CSI-RS resources is not clear, the transmitter can transmit a first PDCCH but not transmit the N aperiodic CSI-RS resources. And the field of CSI-RS resource triggering in the DCI in a first PDCCH may be set of "no triggering of aperiodic CSI-RS resources."

Figure 14:
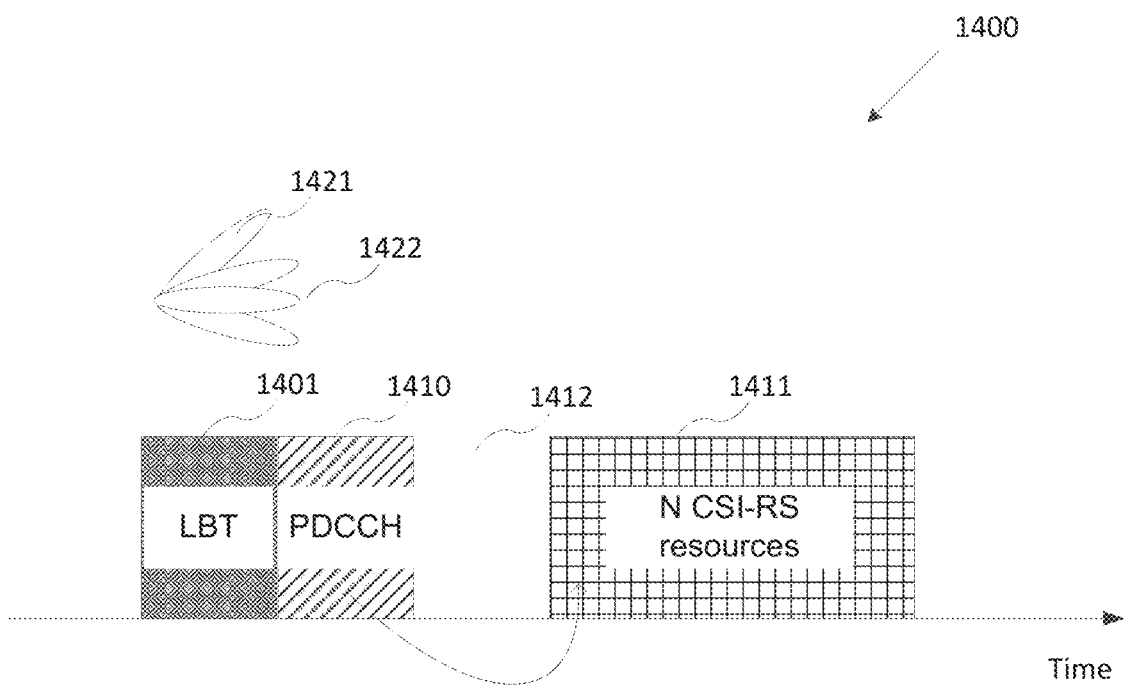
FIG. 14 illustrates an example transmission of aperiodic CSI-RS resources according to embodiments of the present disclosure.

FIG. 14 illustrates an example transmission of aperiodic CSI-RS resources 1400 according to embodiments of the present disclosure. The embodiment of the transmission of aperiodic CSI-RS resources 1400 illustrated in FIG. 14 is for illustration only. FIG. 14 does not limit the scope of this disclosure to any particular implementation.

A transmitter can be configured to transmit PDCCH 1410 and the DCI in PDCCH 1410 indicates the triggering of N aperiodic CSI-RS resources 1411. Before the transmission of PDCCH 1410 and CSI-RS resources 1411, the transmitter is configured to operate a directional LBT 1401 to sense the channel on multiple beamforming directions. The beamforming directions that the transmitter is configured to sense include beam direction 1421 that corresponds to the Tx beam applied to PDCCH 1410 and beam directions 1422 that corresponds to the Tx beam(s) applied to N CSI-RS resources 1411 that is trigged by PDCCH 1410. The number of beam direction can be 1 or more that can be determined based on the Tx beam(s) applied to those N trigged aperiodic CSI-RS resources 1411. If the sensing on beam directions 1421 and 1422 is clear, the transmitter can transmit PDCCH 1410 and N aperiodic CSI-RS resources 1411 that is triggered by PDCCH 1410.

A time gap 1412 can be configured between the triggering PDCCH and triggered CSI-RS transmission so that the receiver (or the UE) has time to decode the PDCCH and then switch to proper receive beam(s) to buffer the triggered CSI-RS resource transmission 1411. If the transmitter is allowed to transmit both PDCCH 1410 and CSI-RS resources 1411, the transmitter can be configured to send some signal during the time gap 1412 to maintain the channel occupancy.

Figure 15:
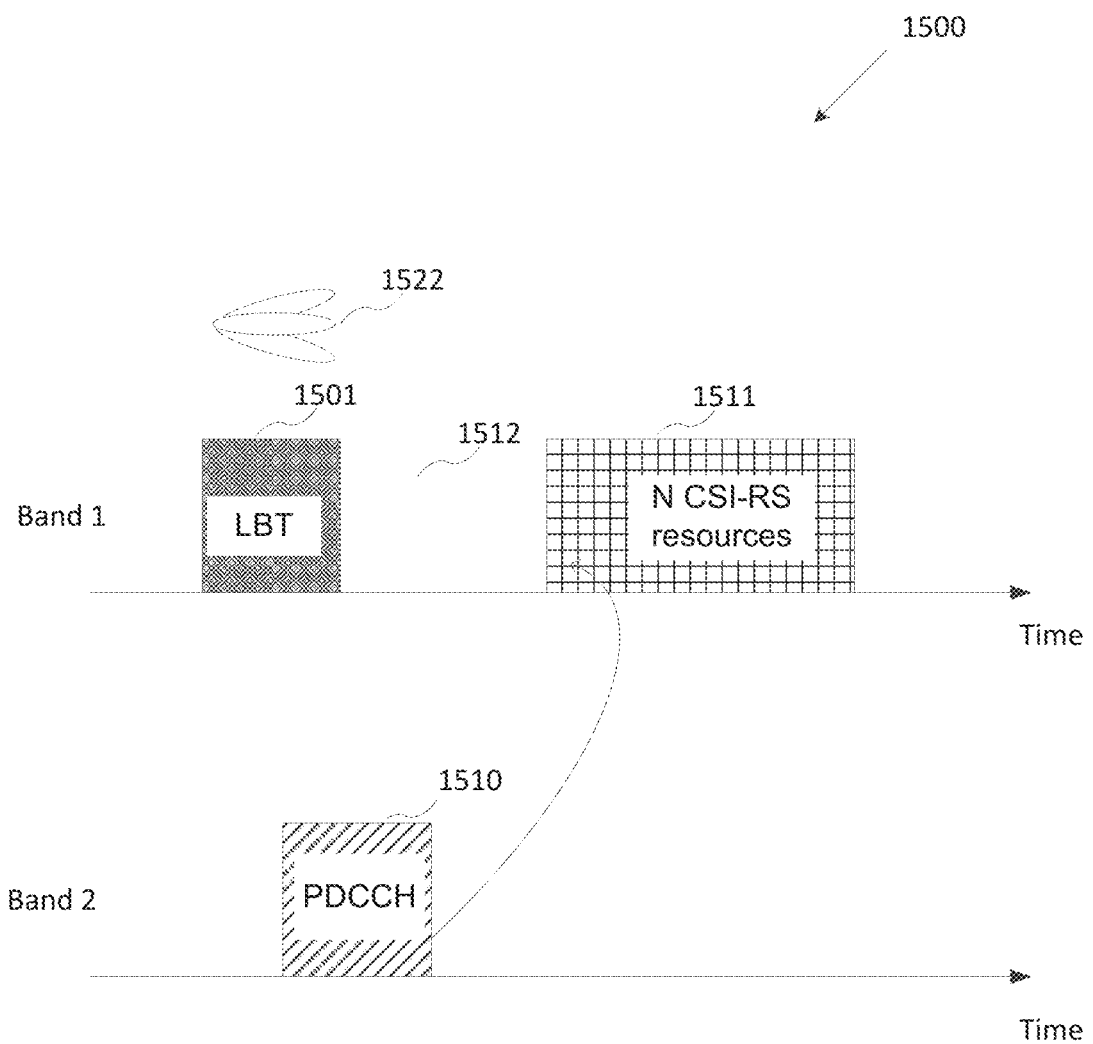
FIG. 15 illustrates another example transmission of aperiodic CSI-RS resources according to embodiments of the present disclosure.

FIG. 15 illustrates another example transmission of aperiodic CSI-RS resources 1500 according to embodiments of the present disclosure. The embodiment of the transmission of aperiodic CSI-RS resources 1500 illustrated in FIG. 15 is for illustration only. FIG. 15 does not limit the scope of this disclosure to any particular implementation.

The DCI triggering aperiodic CSI-RS and the corresponding triggered aperiodic CSI-RS transmission can be sent on different bands. One example is the DCI triggering aperiodic CSI-RS is sent on licensed band and the corresponding triggered aperiodic CSI-RS transmission is sent on unlicensed band. The CSI-RS transmission can be used to do beam management and/or CSI acquisition for unlicensed band. The example of deployment scenarios is non-stand-alone unlicensed band system.

As shown in FIG. 15, a transmitter can be configured to transmit PDCCH 1510 on band 2 and the DCI in PDCCH 1510 indicates the triggering of N aperiodic CSI-RS resources 1511 on band 1. Before the transmission of PDCCH 1510 on band 2 and CSI-RS resources 1511 band 1, the transmitter is configured to operate a directional LBT 1501 on band 1 to sense the channel on multiple beamforming directions. The beamforming directions that the transmitter is configured to sense include beam directions 1522 that corresponds to the Tx beam(s) applied to N CSI-RS resources 1511 to be transmitted on band 1 that is trigged by PDCCH 1510 on band 2. The number of beam direction can be 1 or more that can be determined based on the Tx beam(s) applied to those N trigged aperiodic CSI-RS resources 1511. If the sensing on beam directions 1522 is clear, the transmitter can transmit LBT 1501 (e.g., directional LBT 1501) and N aperiodic CSI-RS resources 1511 that is triggered by PDCCH 1510.

A time gap 1512 can be configured between the triggering PDCCH and triggered CSI-RS transmission so that the receiver (or the UE) has time to decode the PDCCH and then switch to proper receive beam(s) to buffer the triggered CSI-RS resource transmission 1511. If the transmitter is allowed to transmit both PDCCH 1510 and CSI-RS resources 1511, the transmitter can be configured to send some signal during the time gap 1512 to maintain the channel occupancy on band 2.

The challenge to transmit periodic CSI-RS or semi-persistent CSI-RS in unlicensed band is that the channel occupancy for every CSI-RS transmission periodicity is not guaranteed. If the sensing for n-th transmission periodicity is not clear, the transmitter would have to skip the transmission. At the receiver side, the issue is the receiver is not able to know whether one CSI-RS periodicity is really transmitted or not due to the LBT operation. To solve this issue, one solution is to associate the transmission of SSB (ss blocks) and the transmission of CSI-RS for beam management and CSI acquisition. The receiver can use the detection of SSB to determine whether valid CSI-RS transmission is sent or not and then make proper measurement and reporting as configured.

In general, SSBs are transmitted periodically for every $T_s$ slots. In each SSB period, there can be $N_s \geq 1$ SSB bursts and each SSB burst can contain multiple SSBs. Those SSBs are sent in different symbols. Generally, there can be $N_B$ SSBs in each SSB period and those SSBs have different SSB index.

In some embodiments, the configuration of CSI-RS can be based on the transmission configuration of SSBs. The periodicity of one CSI-RS resource can be configured based on the transmission of SSBs. The transmission location of one CSI-RS resource can be configured based on one or more SSBs. If one CSI-RS resource is configured to be sent with a first SSB, the receiver can be requested to first detect the synchronization signal contained in a first SSB and the receiver can be requested to measure the CSI-RS resource only when valid synchronization signals in a first SSB is detected by that receiver.

In one embodiment, the periodicity of one CSI-RS resource can be $L \times T_s$, where L can be 1, 2, . . . and the transmission location of one CSI-RS resource can be configured to a symbol offset to a first SSB index. One CSI-RS resource can be configured with one or more of the followings: the periodicity of CSI-RS resource is L times of the SSB periodicity. L can be 1, 2, 3 . . . ; the SSB index within one SSB periodicity that the CSI-RS resource is associated with; and the symbol offset for time location of the CSI-RS resource.

Figure 16:
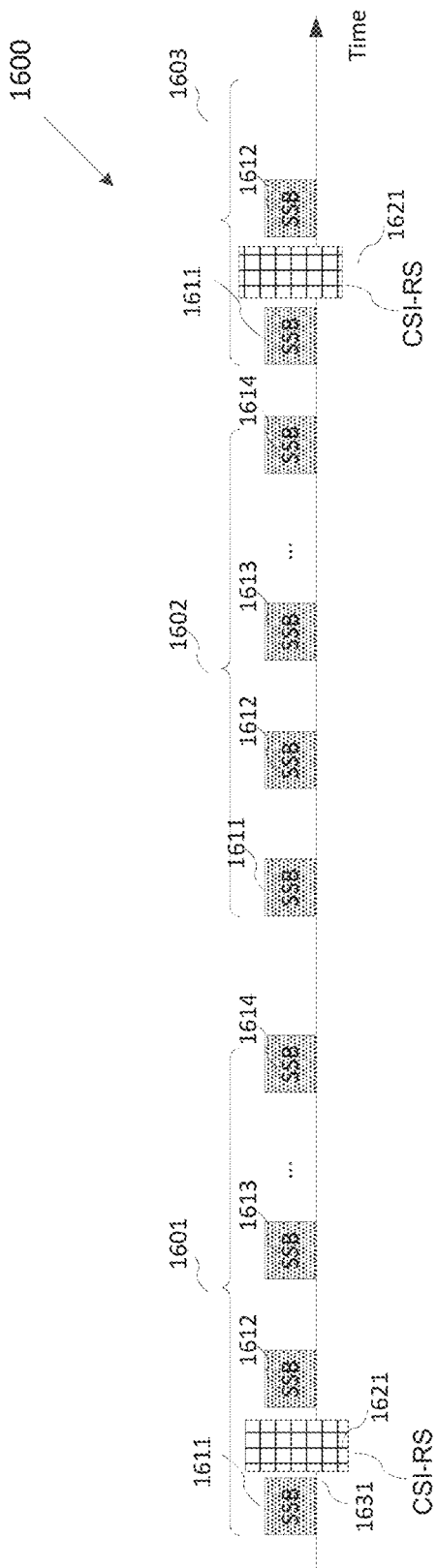
FIG. 16 illustrates yet another example transmission of aperiodic CSI-RS resources according to embodiments of the present disclosure.

FIG. 16 illustrates yet another example transmission of aperiodic CSI-RS resources 1600 according to embodiments of the present disclosure. The embodiment of transmission of aperiodic CSI-RS resources 1600 illustrated in FIG. 16 is for illustration only. FIG. 16 does not limit the scope of this disclosure to any particular implementation.

The transmitter transmits SSB periodically. There are multiple SSBs within each SSB period and the SSBs are, 1611, 1612, 1613, and 1614. Those SSBs are transmitted in each SSB period 1601, 1602, and 1603. One CSI-RS resource 1621 is configured with periodicity being 2 times of SSB periodicity, being associated with SSB 1611 within each SSB period and symbol offset between CSI_RS resource 1621 and SSB 1611.

As shown FIG. 16, the CSI-RS resource 1621 is transmitted in SSB period 1601 and 1603, but not in SSB period 1602. In SSB period 1601, the CSI-RS resource 1621 is sent through the association with SSB 1611. In SSB period 1603, the CSI-RS resource 1621 is sent through the association with SSB 1611. To measure CSI-RS resource 1621 during SSB period 1601, the receiver can be requested to first detect SSB 1611 and if valid SSB is detected from SSB 1611, the receiver can be requested to measure CSI-RS resource 1621. If no valid SSB is detected from SSB 1611, the receiver can be requested to assume that CSI-RS resource 1621 in that transmission instance.

In one embodiment, the periodicity of one CSI-RS resource can be configured based on the SSB burst index. In one example, the periodicity of one CSI-RS resource can be L SSB bursts. The transmission location of one CSI-RS resource can be configured with the index of starting SSB burst and a symbol offset to a first SSB index within each SSB burst index where the CSI-RS is transmitted. One CSI-RS resource can be configured with one or more of the following parameters: the periodicity of CSI-RS resource can be every L SSB bursts. L can be 1, 2, 3 . . . ; the SSB index within a SSB burst, which one CSI-RS is associated with; and the symbol offset for time location of the CSI-RS resource.

In one embodiment, the periodicity of one CSI-RS resource can be configured based on the SSB index. In one example the periodicity of one CSI-RS resource can be L SSBs. The transmission location of one CSI-RS resource can be configured with the index of starting SSB index and a symbol offset to the SSB index wherein the CSI-RS is transmitted together with SSB. One CSI-RS resource can be configured with one or more of the following parameters: the periodicity of CSI-RS resource can be every L SS-blocks. L can be 1, 2, 3 . . . , here a global SSB index can be used; and the symbol offset for time location of the CSI-RS resource.

Figure 17:
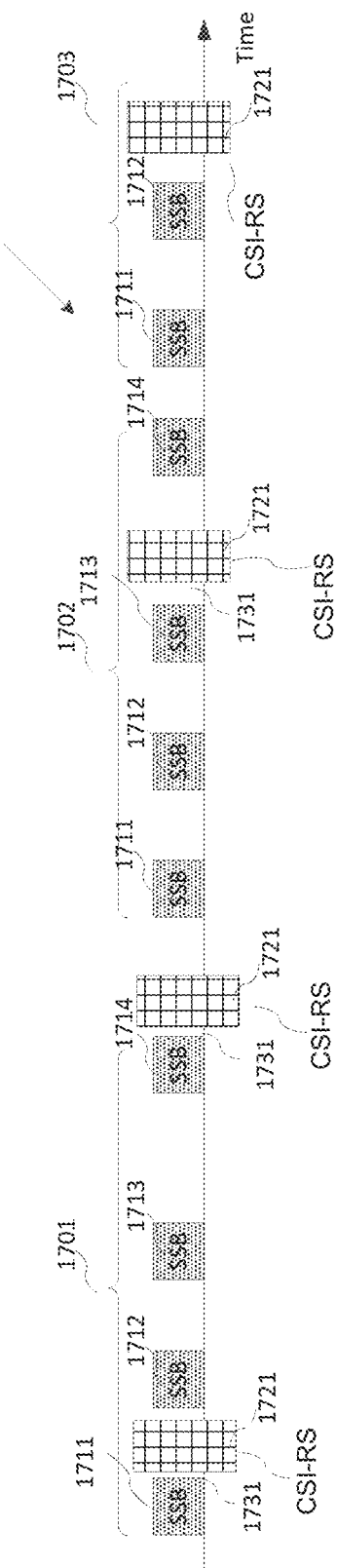
FIG. 17 illustrates yet another example transmission of aperiodic CSI-RS resources according to embodiments of the present disclosure.

FIG. 17 illustrates yet another example transmission of aperiodic CSI-RS resources 1700 according to embodiments of the present disclosure. The embodiment of the transmission of aperiodic CSI-RS resources 1700 illustrated in FIG. 17 is for illustration only. FIG. 17 does not limit the scope of this disclosure to any particular implementation.

The transmitter transmits SSB periodically. There are 4 SSBs within each SSB period and the SSBs are, 1711, 1712, 1713, and 1714. Those SSBs are transmitted in each SSB period 1701, 1702, and 1703. One CSI-RS resource 1721 is configured with periodicity being every 3 SSBs. As shown FIG. 17, the CSI-RS resource 1721 is in every 3 SSBs. The CSI-RS resource 1721 is transmitted with associated with SSB 1711 in SSB period 1701, SSB 1714 in SSB period 1701, SSB 1713 in SSB period 1702, and SSB 1712 in SSB period 1703.

In the present disclosure, embodiments of reporting layer indicator (or called strongest layer indicator) are provided. In the present disclosure, the term LI (layer indicator) and SLI (strongest layer indicator) are interchangeable. Using LI or SLI in the following embodiments are for exemplary. Replacing one term with another term does not change the design and meaning of the embodiments.

In one embodiment, a UE can be requested to report one or multiple strongest layer indicator(s) (can also be called layer indicator). The UE can report the layer indicator together with CQI/PMI/RI. However, the UE does not report the layer indicator all the time. If some conditions are met, the UE does not report the layer indicator in CSI reporting. If some conditions are met, the UE can report the layer indicator in CSI reporting.

In one embodiment, the UE can be configured with a higher layer parameter Downlink-PTRS-Config. If the higher layer parameter Downlink-PTRS-Config is set to "Off" or if the higher layer parameter Downlink-PTRS-Config is not set to "On," the UE can be requested to not report layer indicator in CSI reporting.

The reporting contents of CSI including layer indicator can include: CQI; RI (rank indicator); PMI; layer indicator (also can be called strongest layer indicator); and CQI and PMI of the $2^{nd}$ codeword.

The layer indicator would be useful for the gNB to decide which one of the precoders is the best choice for transmitting PTRS (phase tracking reference signal). In general, one PTRS port and multiple DMRS ports are transmitted. The PTRS port is associated with the DMRS port with lowest port index. With the knowledge of which layer has the strongest signal strength or the highest signal-to-interference and noise ratio or is the most preferred layer of the UE, then the gNB can choose to apply the precoder of the layer with the best quality to the PTRS transmission.

In one embodiment, the higher layer parameter Downlink-PTRS-Config is set to "On." The UE can dynamically select whether to report layer indicator or not in one CSI report based on the value of RI (i.e., the reported rank) reported in the same CSI report. If the RI reported in one CSI report is 0, i.e., the rank is 1, then the UE can be requested to not report layer indicator in that CSI report. If the RI reported in one CSI report is larger than 0, i.e., the rank is larger than 1, then the UE can be requested to report layer indicator in that CSI report.

In one embodiment, the higher layer parameter Downlink-PTRS-Config is set to "On." The UE can dynamically select whether to report layer indicator or not in one CSI report based on the value of CQI reported in the same CSI report. If the CQI reported in one CSI report is less than a first CQI threshold, then the UE can be requested to not report layer indicator in that CSI report. If the CQI reported in one CSI report is larger or equal to a first CQI threshold, then the UE can be requested to report layer indicator in that CSI report. A first CQI threshold can be a preconfigured or predefined value.

In one embodiment, the higher layer parameter Downlink-PTRS-Config is set to "On." The UE can dynamically select whether to report layer indicator or not in one CSI report based on the value of CQI and RI reported in the same CSI report. If the value of RI is 0, i.e., the rank is 1, then the UE can be requested to not report layer indicator in that CSI report. If the RI reported in one CSI report is larger than 0, i.e, the rank is larger than 1, then The UE can be requested to report layer indicator (or can also be called strongest layer indicator) if the CQI reported in that CSI report is larger or equal to a first CQI threshold.

The UE can be requested to not to report layer indicator (or can also be called strongest layer indicator) if the CQI reported in that CSI report is less than a first CQI threshold.

In one embodiment, the UE can be requested to determine whether to report layer indicator (or can also be called strongest layer indicator) based on wideband CQI. The UE can dynamically select whether to report layer indicator or not in one CSI report based on the value of wideband CQI reported in the same CSI report. If the wideband CQI reported in one CSI report is less than a second CQI threshold, then the UE can be requested to not report layer indicator in that CSI report. If the wideband CQI reported in one CSI report is larger or equal to a second CQI threshold, then the UE can be requested to report layer indicator in that CSI report. A second CQI threshold can be a preconfigured or predefined value.

In one embodiment, the UE can be requested to determine whether to report layer indicator (or can also be called strongest layer indicator) based on subband CQI. The UE can dynamically select whether to report layer indicator or not in one CSI report based on the value of subband CQI reported in the same CSI report. If the one or more of the subband CQIs reported in one CSI report is larger than or equal to a third CQI threshold, then the UE can be requested to not report layer indicator in that CSI report. If all the subband CQI reported in one CSI report is less than a third CQI threshold, then the UE can be requested to report layer indicator in that CSI report. A third CQI threshold can be a preconfigured or predefined value.

In one embodiment, the UE can be requested to determine whether to report layer indicator based on wideband CQI, subband CQI(s) and/or RI. In one example, the UE can be requested to report layer indicator if the wideband CQI is larger than or equal to a first threshold and if one or more of the reported subband CQIs are larger than or equal to a second threshold, then the UE can be requested to report layer indicator.

In one embodiment, the UE can be requested to compare the CQI with a RI-dependent threshold to determine whether to report layer indicator or not. In one example, the UE can be configured with a first threshold for RI=1, a second threshold for RI=2, a third threshold for RI=3. Then if the reported RI=1: if the CQI is larger than or equal to a first threshold, then the UE reports layer indicator; and if the CQI is less than a first threshold, then the UE does not report layer indicator in that CSI.

Then if the reported RI=2: if the CQI is larger than or equal to a second threshold, then the UE reports layer indicator in that CSI; and if the CQI is less than a second threshold, then the UE does not report layer indicator in that CSI.

Then if the reported RI=3: if the CQI is larger than or equal to a third threshold, then the UE reports layer indicator in that CSI; and if the CQI is less than a third threshold, then the UE does not report layer indicator in that CSI.

In one embodiment, the UE can determine whether to report the layer indicator based on the CSI reporting payload. If the reporting payload is larger than some threshold, then the UE can be requested to not report layer indicator. If the reporting payload is less than some threshold, then the UE can be requested to report layer indicator.

In one embodiment, the UE can determine whether to report the layer indicator based on the UL channel choice. In one example, if the CSI report is sent in PUCCH channel, the UE can be requested to not report layer indicator. In one example, if the CSI report is sent in PUSCH channel, the UE can report layer indicator in the CSI report.

In one embodiment, the UE can be requested to determine whether to report the layer indicator based on the ratio of SINR of strongest layer and SINR of the weakest layer. If the ratio is large than or equal to some threshold, the UE can be requested to report layer indicator in one CSI report. If the ration is less than some threshold, the UE can be requested to not to report layer indicator in one CSI report.

In one example, the UE reports RI=1 in one CSI report. The UE can be requested to measure the SINR of layer 1 and layer 2. Assume layer 1 has larger SINR than layer 2. The UE can calculate the ratio between SINR of layer 1 and SINR of layer 2. If the ratio is larger than or equal to some threshold, the UE can report the layer indicator in that CSI report. If the ratio is less than some threshold, the UE can be requested to not report the layer indicator in that CSI report.

Some or all of the condition described the aforementioned embodiments can be combined together to determine whether the layer indicator may be reported or not in one CSI report.

A UE may not report SLI if a UE is not configured with the higher layer parameter Downlink-PTRS-Config set to "ON." A UE may not report SLI if a UE not configured with the higher layer parameter Downlink-PTRS-Config. A UE may not report SLI if a UE is configured with the higher layer parameter Downlink-PTRS-Config set to "OFF."

A UE may not report SLI in one CSI report if a UE is not configured with the higher layer parameter Downlink-PTRS-Config set to "ON." A UE may not report SLI in in one CSI report if a UE not configured with the higher layer parameter Downlink-PTRS-Config. A UE may not report SLI in one CSI report if a UE is configured with the higher layer parameter Downlink-PTRS-Config set to "OFF."

When a UE is configured with the higher layer parameter Downlink-PTRS-Config set to "ON," the UE may report the SLI as follows. In one example, if the additional higher layer parameters timeDensity for PT-RS is configured, the UE may report SLI in one CSI report when the reported RI is >0 and the corresponding efficiency of reported wideband CQI is greater than the corresponding efficiency of ptrs-$MCS_1$.

Otherwise, the UE may report SLI in one CSI report when the reported RI is >0 and the efficiency of reported wideband CQI is greater than the efficiency of MCS 10 or when the efficiency of reported wideband CQI is greater than the efficiency of MCS 5.

The UE may not report SLI for all other configurations.

When a UE is configured with the higher layer parameter Downlink-PTRS-Config set to "ON," the UE may report the SLI as follows. In one example, if the additional higher layer parameters timeDensity for PT-RS is configured, the UE may report SLI in one CSI report when the reported RI is >0 and the corresponding efficiency of reported wideband CQI is greater than the corresponding efficiency of ptrs-$MCS_1$. In one example, if the additional higher layer parameters timeDensity for PT-RS is configured, the UE may report SLI in one CSI report when the reported is >0 and the corresponding efficiency of reported wideband CQI is greater than the corresponding efficiency of ptrs-$MCS_1$.

In one example, the UE may report SLI in one CSI report when the reported RI is >0 and the efficiency of reported wideband CQI is greater than the efficiency of MCS 10 or when the efficiency of reported wideband CQI is greater than the efficiency of MCS 5. The UE may not report SLI for all other configurations.

In some embodiments, the UE can be requested to report one layer indicator (or can be also called strongest layer indicator) for each subband CQI.

In one embodiment, if the reported RI is larger than 0 and one subband CQI is larger or equal to one threshold, the UE can be requested to report the layer indicator (or can be called strongest layer indicator) for that subband CQI. If one subband CQI is less than one threshold, the UE can be requested to not report the layer indicator for that subband CQI.

In one embodiment, the UE can be requested to determine whether to report layer indicator for one subband CQI according the value of wideband CQI, the value of subband CQI and/or RI. If the reported RI is larger than 0, wideband CQI is larger than or equal to a first threshold and the subband CQI is larger than or equal to a second threshold, the UE can be requested to report the layer indicator.

In some embodiments, the UE can be requested to report one layer indicator for each subset of subband CQIs.

In one embodiment, if the reported RI is larger than 0 and the metric of one subset of subband CQIs is larger or equal to one threshold, the UE can be requested to report the layer indicator (or can be called strongest layer indicator) for that subband CQI. If the metric of one subset of subband CQIs is less than one threshold, the UE can be requested to not report the layer indicator for that subband CQI. The metric of one subset of subband CQIs can be one of the following: the largest CQI among that subset of subband CQI; the minimum CQI among that subset of subband CQIs; and the mean or averaged CQI of that subset of subband CQIs.

In some embodiments, the UE can be requested to report layer indicator for each CW (codeword) reported in the CSI report. When the CSI (CQI, differential subband CQI and/or PMI) for two CWs are reported in one CSI report, the UE can be requested to report on layer indicator for each reported CW.

In one example, RI=4, i.e. the rank=5 and two CWs are reported. One layer indicator can be reported for the first CW to indicate which one of the first three layer is selected. One layer indicator can be reported for the second CW to indicate which one of the second two layers is selected for second CW.

In one example, RI=5, i.e., the rank=6 and two CWs are reported. One layer indicator can be reported for the first CW to indicate which one of the first three layer is selected. One layer indicator can be reported for the second CW to indicate which one of the second three layers is selected for second CW.

In one example, RI=6, i.e., the rank=7 and two CWs are reported. One layer indicator can be reported for the first CW to indicate which one of the first four layer is selected. One layer indicator can be reported for the second CW to indicate which one of the second three layers is selected for second CW.

In one example, RI=7, i.e., the rank=8 and two CWs are reported. One layer indicator can be reported for the first CW to indicate which one of the first four layer is selected. One layer indicator can be reported for the second CW to indicate which one of the second four layers is selected for second CW.

The UE can be requested to determine whether to report the layer indicator for one CW based on the CQI reported for that CW. In one example, if the wideband CQI of that CW is larger than or equal to some threshold, then the UE can be requested to report layer indicator for that CW and if the wideband CQI of that CW is less than some threshold, then the UE can be requested to not report layer indicator for that CW.

In some embodiments, the UE can be requested to report one layer indicator for CSI report with reporting two codewords (CWs). The UE can be requested to determine whether to report the layer indicator based on the CQI of both CWs.

In one example, the UE can report the layer indicator if the wideband CQI of both CWs are larger or equal to some threshold. If wideband CQI of one of these two CWs or both CWs are less than some threshold, the UE does not report the layer indicator.

In one example, the UE can report the layer indicator if the wideband CQI of first CW or second CW or the wideband CQI of both CWs is larger or equal to some threshold. If the wideband CQI of both CWs are less than some threshold, the UE does not report the layer indicator.

A UE may report two SLIs in one CSI report when the RI reported in one CSI report is >3, i.e., the reported rank=5, 6, 7 or 8. The first reported SLI is for the first codeword and the second reported SLI is for the second codeword.

In one embodiment, the UE can be requested to report one LI value when only one DMRS-port-group is configured (for example higher layer parameter DMRS-gourp1 is configured).

In one embodiment, the UE can be requested to report LI values when two DMRS port groups are configured, as follows.

In one example, when the reported RI is 1/2/3/, i.e., the rank=2/3/4, the UE may report one LI value.

In one example, when the reported RI is 4/5/6/7/, i.e., the rank=5/6/7/8, the UE may report two LI values. In one example, the UE may report a first LI value to indicate the most preferred layer among layers of first CW and the UE may report a second LI value to indicate the most preferred layer among layers of second CW. In one example, the UE may report two LI values and each LI value is the most preferred layer among the layers of one CW.

In one example, when the reported RI is 4/5/6/7, i.e., the rank=5/6/7/8, the UE may report two LI values. In one example, the UE may report a first LI value to indicate the most preferred layer among all the layers of two CWs and the UE may report a second LI value to indicate the most preferred layer among all the layers of one CW in which the layer indicated by a first LI value does not belong to.

In one example, the UE reports a first LI value to indicate the most preferred layer among all the layers of two CWs. If the a first LI value indicates one layer among the layers for the first CW, then the UE hall report a second LI value to indicate the most preferred layer among all the layers of second CW. If the a first LI value indicates one layer among the layers for the second CW, then the UE hall report a second LI value to indicate the most preferred layer among all the layers of first CW.

When the reported RI is 4/5/6/7, i.e. the rank=5/6/7/8, the UE may report two LI values to indicate the most first 2 preferred layers among all the reported layers.

In one embodiment, one RI field in CSI report can be used to indicate the values of two reported Lis.

In one embodiment, the bit-width of layer indicator field in one CSI report can depend on the reported RI value in the same CSI report. In one embodiment, the bit-width of layer indicator field in one CSI report can be ceil(log2(A+1)), where A is the reported RI value in the same CSI report.

The LI may be reported in 2nd CSI part if two-part CSI reporting to be reported and LI is configured to be reported. The UE may not report layer indicator (LI) in one CSI report when PT-RS is off: i.e., parameter Downlink-PTRS-Config is not 'On' or reported RI=0 (i.e., Rank=1).

The UE may report LI as follows. In one example, if one DMRS-group is configured, for one LI value, the most preferred layer and bit-width is ceil(log2(RI+1)), where RI is the reported RI in first CSI part. In one example, if two DMRS-groups are configured: for one LI value, the most preferred layer when reported RI=1/2/3 (i.e., rank=2/3/4); for two LI values, one preferred LI for each CW, when reported RI>=4 (i.e., rank>=5); and the reported two LI values are jointly encoded in one LI field.

In one embodiment, the bit-width of layer indicator field reported in one CSI report can be decided based on one or more of the followings: the reported rank in that CSI report; and the number of configured DM-RS group.

In one embodiment, a UE can be configured to determine the bit-width of layer indicator field according to the rank (i.e., RI) reported in the same CSI report. In one embodiment, a UE can be requested to determine the bit-width of layer indicator field according to the rank reported in the same CSI report and the number of configured DM-RS group.

In one example, the bit-width of layer indicator field in one CSI report can be: if one DM-RS group is configured, the number of bits used for layer indicator field can be $[\log_2 (R+1)]$, where R is the RI (rank indicator) reported in the same CSI report; if two DM-RS groups are configured and the RI reported in one CSI report is <4 (i.e., the reported rank is <=4), the number of bits used for layer indicator can be $[\log_3 (R+1)]$, where R is the RI (rank indicator) reported in the same CSI report; if two DM-RS groups are configured and the RI reported in one CSI report is <4 (i.e., the reported rank is <=4), the number of bits used for layer indicator can be: 4 bits for reported RI=3, 3 bits for reported RI=2. 0 bits for reported RI=1. 1 bits for reported RI=1; and if two DM-RS groups are configured and the RI reported in one CSI report is >=4 (i.e., the reported rank is >4), the number of bits used for layer indicator can be: 4 bits for reported RI=4, 4 bits for reported RI=5, 6 bits for reported RI=6 and 6bis for reported RI=7.

In one embodiment, the bit-width of layer indicator field in one CSI report can be: for RI=1, bit-width=1; for RI=2, bit-width=2; for RI=3, bit-width=2; and for RI=4/5/6/7, bit-width=3.

In one embodiment, the bit-width of layer indicator field in one CSI report can be: for RI=1, bit-width=1; for RI=2, bit-width=2; for RI=3, bit-width=2; for RI=4, bit-width=3; and for RI=5/6/7, bit-width=4.

In one embodiment, the bit-width of layer indicator field in one CSI report can be: for RI=1, bit-width=1; for RI=2, bit-width=2; for RI=3, bit-width=2; for RI=4, bit-width=4; for RI=5, bit-width=5; and for RI=6/7, bit-width=6.

In one embodiment, the UE may determine the number of layer indicators to be reported in one CSI report according to the number of configured DMRS-groups.

In one embodiment, if the number of configured DM-RS group is 1, the UE can be requested to report one layer indicator in one CSI report and if the number of configured DM-RS group is 2, the UE can be requested to report two layer indicators in one CSI report.

In one embodiment, if the number of configured DM-RS group is 1, the UE can be requested to report one layer indicator in one CSI report: if the reported rank is <=4 (i.e. reported RI<=3), the UE can be requested to report the index of one preferred layer among those layer; and if the reported rank is >4 (i.e., reported RI>3), the UE can be requested to report the index of one preferred layer among all the layers of two codewords.

In one embodiment, if the number of configure DM-RS group is 2, the UE can be requested to report indexes of two selected layers in one CSI report. The UE can be requested to select the preferred layers according to the rank reported. In one example, the UE can be requested to select the preferred layers according to the following embodiments: if the reported rank is <=4, the UE can be requested to select the most two preferred layers among all reported layers; if the reported rank is 3 or 4, the UE can be requested to select the most two preferred layers among all reported layers. If the reported rank is 2, the UE does not report layer indicators; and if the reported rank is >4, the UE can be requested to select one preferred layer for each codeword.

In some embodiments, the UE can be requested determine whether to repot layer indicator in one CSI report based previous reported layer indicator and current layer indicator.

In one embodiment, if the current layer indicator and previous reported layer indicator are same, then the UE does not report layer indicator in one CSI report.

In the present disclosure, the embodiments of beam indication for downlink and uplink channel transmission are provided.

In one embodiment, a UE can be configured with Tx beam information for one PUCCH channel. When the UE transmit on one PUCCH channel, the UE can be requested to apply the indicated Tx beam as configured by the system.

In one embodiment, a UE can be configured with a parameter PUCCH-Spatialrelationinfo for one PUCCH resource, which can be used to indicate the transmit beam information for that PUCCH resource. The parameter PUCCH-Spatialrelationinfo can CSI-RS resource index, SS/PBCH block index or SRS resource index. The UE can be requested to derive the spatial transmit filter based on the CSI-RS resource index, SS/PBCH block index or SRS resource index configured through parameter PUCCH-Spatialrelationinfo.

In one embodiment, the parameter PUCCH-Spatialrelationinfo can be configured through RRC (radio resource control) signaling. If a UE has received higher layer parameter PUCCH-Spatialrelationinfo containing single RS ID (for example one CSI-RS resource index, one SS/PBCH block index or one SRS resource index), the UE assumes that the PUCCH resource may be transmitted with the same spatial domain filter used for reception or transmission of the RS ID configured.

In one embodiment, a UE can be configured with a set of PUCCH resources indicated in system information. The UE can be requested to use the transmit beam that the UE used to transmit UL transmission successfully during initial access to transmit the PUCCH resources configured by system information. In one embodiment, a UE can be configured with a set of PUCCH resources provided by higher layer parameter PUCCH-resource-common in SystemInformationBlockType1. To transmit PUCCH on PUCCH resources configured by PUCCH-resource-common in SystemInformationBlockType1, the UE can be requested to use the spatial domain transmission filter that is used to transmit msg1 in random access procedure successfully.

To transmit PUCCH on PUCCH resources configured by PUCCH-resource-common in SystemInformationBlockType1, the UE can be requested to use one of the following examples to transmit the PUCCH on PUCCH resources configured by PUCCH-resource-common in SystemInformationBlockType1.

In one example, the UE can be requested to use the spatial domain transmission filter that is used to transmit msg1 in random access procedure successfully.

In one example, the UE can be requested to use the spatial domain transmission filter that is used to transmit msg3 in random access procedure successfully.

In one example, the UE can be requested to use the same spatial domain transmission filter as the spatial domain reception filter used to receive msg2 in random access procedure successfully.

In one example, the UE can be requested to use the same spatial domain transmission filter as the spatial domain reception filter used to receive msg4 in random access procedure successfully.

To transmit PUCCH on PUCCH resources configured by PUCCH-resource-common in SystemInformationBlockType1, the UE can be requested to use the same spatial filter as the spatial filter used for the reception of the SS/PBCH block identified in an initial access procedure.

In one embodiment, a UE can be configured with spatial transmission filter information through the higher layer parameter PUCCH-Spatialrelationinfo. When there are more than one RS IDs configured in higher layer parameter PUCCH-Spatialrelationinfo, a MAC-CE signaling can be used to select/activate one of RS IDs configured PUCCH-Spatialrelationinfo for the UE to determine the spatial transmission filter for the transmission on PUCCH resource. In one embodiment, if the UE has received the higher layer parameter PUCCH-Spatialrelationinfo with multiple RS IDs but have not received the MAC-CE activation one of those configured RS IDs, during this time duration, the UE may transmit the PUCCH with one of the following spatial domain filter examples.

In one example, the UE may transmit the PUCCH with the spatial domain transmission filter same to the spatial domain receive filter used to receive the msg2 or msg 4 during initial access procedure.

In one example, the UE may transmit the PUCCH with the spatial domain transmission filter same to the spatial domain filter to transmit msg1 or msg3 successfully during random access procedure.

In one example, the UE may transmit the PUCCH with the spatial domain transmission filter same to the spatial domain receive filter used to receive the SS/PBCH block identified during initial access procedure.

In one example, the UE may transmit the PUCCH with spatial domain transmission filter that corresponds to one particular entry or item the RS IDs configured in PUCCH-Spatialrelationinfo. In one example, it can be the first one. In one example, it can be the last one.

In one example, the UE may transmit the PUCCH with spatial domain transmission filter that corresponds to the first entry of the RS IDs configured in PUCCH-Spatialrelationinfo. In one example, if the first entry of the RS IDs configured in PUCCH-Spatialrelationinfo is a CSI-RS resource index or a SS/PBCH block index, the UE may transmit the PUCCH with the same spatial domain transmission filter used for the reception of that CSI-RS resource or SS/PBCH block. In one example, if the first entry of the RS IDs configured in PUCCH-Spatialrelationinfo is a SRS resource index, the UE may transmit the PUCCH with the same spatial domain transmission filter used for the transmission of that SRS resource.

In one example, the UE may transmit the PUCCH with spatial domain filter that corresponds to the last entry of the RS IDs configured in PUCCH-Spatialrelationinfo.

In one embodiment, if a UE has received initial higher layer configuration PUCCH-SpatialRelationinfo of more than one RS ID values (i.e., multiple values, or multiple entries) but has not received the a selection command to select one of those configured values, the UE can assume to transmit the PUCCH with the spatial domain filter that is used to transmit msg1 or msg3 PUSCH in RACH. In one example, here the UE can assume to transmit the PUCCH with the spatial domain transmit filter that is indicated by first entry of the list of RS ID values configured in PUCCH-SpatialRelationinfo. Here the first entry can be replaced with the last one.

After a UE receives higher layer re-configuration of PUCCH-SpatialRelationinfo of more than one RS ID values for one PUCCH resource, the UE can be requested to assume to use the selected RS ID value configured before the re-configuration on that PUCCH resource transmission until reception of next selection command to select/activate one from the re-configured.

In one embodiment, Tx beam information can be configured for all the PUCCH resources. In one embodiment, one or more PUCCH resource can be configured to one UE through high layer signaling (for example RRC). The UE can be configured with one high layer parameter PUCCH_SpatialRelationInfo. The PUCCH_SpatialRelationInfo contains one or more RS IDs that the UE can use to derive the spatial domain transmit filter for all the transmission on all PUCCH resource configured by RRC. The UE can be requested to use a single same spatial domain transmit filter for the transmission on all PUCCH resources configured by RRC. If there are more than one RS ID contained in PUCCH_SpatialRelationInfo, a MAC-CE selection command can be sent to select/activate one of those configured RS ID for the UE to use to derive the spatial domain transmit filter.

In general, for the transmission of PUSCH, one or multiple SRI (SRS resource indicator) in the UL assignment DCI can indicate the information of spatial domain transmission filter. However, DCI format 0_0 (i.e., the fallback UL DCI format) does not have the field used to deliver the SRI information. Therefore, it is required that special embodiments are designed for the UE to determine the spatial domain transmission filter (i.e. the transmit beamformer) for the PUSCH scheduled by DCI format 0_0.

In one embodiment, for the PUSCH scheduled by DCI that does not contain the Tx beamforming information for the PUSCH, the UE can be requested to transmit the PUSCH with one or more of the following examples.

In one example, the UE can use the Tx beamfomer that correspond to the Rx beam that is used to receive the PDCCH or control resource set where the scheduling DCI format is decoded.

In one example, the UE can use the Tx beamfomer that is used to transmit the msg2 or msg3 during random access procedure.

In one example, the UE can use the Tx beamfomer that corresponds to the Rx beam that is used to receive and identify the initial access signals for example, the PSS or SSS signals, the PBCH signals.

In one example, the UE can use the Tx beamfomer that is applied to one SRS resource that is sent at some slot or subframe before the transmission of that PUSCH.

In one example, the UE can be requested to use the Tx beamformer that is pre-configured by the NW. Higher layer signaling can be used to indicate one RS ID for the UE and the UE can be requested to transmit the PUSCH scheduled by DCI format that does not contain Tx beamforming information (for example DCI format 0_0) with the spatial domain transmit filter same to the reception or transmission of the configured RS ID.

In one example, the UE can be requested to use the Tx beamformer that is used to transmit one uplink control channel as configured by the NW.

In one embodiment, for one PUSCH scheduled by one DCI format 0_0 (i.e., fallback DCI), the UE can be requested to use the transmit beam (or spatial domain transmission filter) to transmit that PUSCH as one or more of the following examples.

In one example, for one PUSCH scheduled by on DCI format 0_0, the UE may transmit that PUSCH with the transmit beamformer that is same to the receive beamformer used to receive the PDCCH/control resource set where the scheduling DCI format 0_0 is detected.

In one example, for one PUSCH scheduled by one DCI format 0_0, the UE may transmit that PUSCH with the spatial domain transmission filter same to the spatial filter used to receive the PDCCH where the scheduling DCI format 0_0 is detected.

In one example, for one PUSCH scheduled by one DCI format 0_0, the UE may transmit that PUSCH with the spatial domain transmission filter same to the spatial domain transmission filter used to transmit the latest SRS resource transmission.

In one example, for one PUSCH scheduled by one DCI format 0_0 to be transmitted at slot n, the UE may transmit that PUSCH with the spatial domain transmission filter same to the spatial domain transmission filter used to transmit the latest SRS resource transmission before slot n-k, where k is a value >=0. k can be configurable. The k can depend on UE capability.

For one PUSCH scheduled by one DCI format 0_0, the UE may transmit that PUSCH with spatial domain transmission filter same to the spatial domain transmission filter that is used to transmit msg1 or msg3 in random access procedure.

For one PUSCH scheduled by one DCI format 0_0, the UE may transmit that PUSCH with spatial domain transmission filter same to the spatial domain filter that is used to receive msg2 or msg4 in random access procedure.

For one PUSCH scheduled by one DCI format 0_0, the UE may transmit that PUSCH with spatial domain transmission filter same to the spatial domain filter that is used to receive the SS/PBCH block that the UE identifies during initial access procedure.

In one embodiment, for one PUSCH scheduled by one DCI format 0_0 (i.e., fallback DCI), the UE can be configured with a higher layer parameter $X_0$ which provides one or more Reference signal IDs. The UE can be requested to use the reference signal ID indicated from $X_0$ to apply the spatial transmit filter on PUSCH scheduled by DCI format 0_0.

In one embodiment, the UE can be requested to use the spatial transmit filter used to transmit one PUCCH channel to transmit the PUSCH scheduled by DCI format 0_0. If one PUSCH is scheduled by DCI format 0_0, the UE can be requested to use the spatial transmit filter to transmit that PUSCH as one or more of the follows.

In one example, the UE can use the same spatial transmit filter used to transmit PUCCH transmission with HARQ-ACK information to transmit the PUSCH scheduled by DCI format 0_0.

In one example, the UE can use the same spatial transmit filter used to transmit PUCCH transmission with PUCCH format 0 configured though higher layer parameter PUCCH-format0 to transmit PUSCH scheduled by DCI format 0_0.

In one example, the UE can use the same spatial transmit filter used to transmit PUCCH transmission with PUCCH format 1 configured through higher layer parameter PUCCH-format1 to transmit PUSCH scheduled by DCI format 0_0.

In one example, the UE can use the same spatial transmit filter used to transmit PUCCH transmission with PUCCH format 2 configured through higher layer parameter PUCCH-format2 to transmit PUSCH scheduled by DCI format 0_0.

In one example, the UE can use the same spatial transmit filter used to transmit PUCCH transmission with format 3 configured through higher layer parameter PUCCH-format3 to transmit PUSCH scheduled by DCI format 0_0.

In one example, the UE can use the same spatial transmit filter used to transmit PUCCH transmission with format 4 configured through higher layer parameter PUCCH-format4 to transmit PUSCH scheduled by DCI format 0_0.

In one example, the UE can use the spatial transmit filter as configured by the higher layer parameter SpatialRelation-Info configured to PUCCH resource i, where i is the higher layer parameter PUCCH-resource-index used to indicate one PUCCH resource. The value i can be predefined in the specification. For example, i can be 0, 1. In one example, i can be the lowest index of PUCCH resource that is configured with higher layer parameter SpatialRelationInfo that provide information for the UE to determine the spatial domain transmit filter for the PUCCH.

In one embodiment, if a UE has not established an RRC connection, the UE can be requested to transmit PUSCH scheduled by DCI format 0_0 with the spatial domain transmit filer same to the transmit filter used to transmit msg3 PUSCH. If a UE has established an RRC connection, the UE can be requested to transmit PUSCH scheduled by format 0_0 with spatial domain transmit filter by following one or more of the embodiments descried above.

In one embodiment, if a UE does not have dedicated PUCCH resource configuration, for the transmission of a PUSCH scheduled by DCI format 0_0, the UE can be requested to use the same spatial domain transmission filter as for Msg3 PUSCH transmission (or for msg1 PRACH preamble transmission). If a UE is configured with dedicated PUCCH resource configuration, the UE can be request to transmit a PUSCH scheduled by DCI format 0_0 through using the same spatial domain transmission filter as for the PUCCH resource with lowest PUCCH resource index (the resource index is indicated by higher layer parameter PUCCH-ResouceId) in the PUCCH resource set with the lowest PUCCH resource set index (the PUCCH resource set index is indicated by higher layer parameter pucch-ResourceSetId).

The PUCCH resource used for spatial relation information for a PUSCH can be the PUCCH configured in the same UL BWP. The PUCCH resource used for spatial relation information for a PUSCH scheduled by DCI format 0_0 can be the PUCCH configured in an active BWP with lowest UL BWP index. Other alternatives for determining the PUCCH resource used to determine the spatial domain transmission filter for a PUSCH scheduled by DCI format 0_0 can be: a PUCCH resource with lowest PUCCH resource index (i.e., lowest PUCCH-ResouceId) in the configured PUCCH resource set with lowest PUCCH resource set index (i.e., lowest pucch-ResourceSetId) among configured PUCCH resource set(s); a PUCCH resource with lowest PUCCH resource index (i.e., lowest PUCCH-ResouceId) in the configured PUCCH resource set with largest PUCCH resource set index (i.e., largest pucch-ResourceSetId) among configured PUCCH resource set(s); a PUCCH resource with largest PUCCH resource index (i.e., largest PUCCH-ResouceId) in the configured PUCCH resource set with lowest PUCCH resource set index (i.e., lowest pucch-ResourceSetId) among configured PUCCH resource set(s); a PUCCH resource with largest PUCCH resource index (i.e., largest PUCCH-ResouceId) in the configured PUCCH resource set with largest PUCCH resource set index (i.e., largest pucch-ResourceSetId) among configured PUCCH resource set(s); the PUCCH resource with lowest PUCCH resource index (i.e., lowest PUCCH-ResouceId) among all configured PUCCH resources; and the PUCCH resource with largest PUCCH resource index (i.e., largest PUCCH-ResouceId) among all configured PUCCH resources.

In one embodiment, a UE can be indicated with Rx beam information for the reception of PDSCH. The UE can be configured/indicated with Rx beam information for PDSCH, the UE can be requested to use the indicated Rx beam to receive the PDSCH. In one embodiment, the UE can be indicated with Rx beam information for the reception of PDSCH in the control signaling that schedules the same PDSCH.

In one embodiment, if the assignment DCI does not contain the Rx beam information the scheduled PDSCH, the UE can be requested to assume to the one of the following Rx beam to receive the PDSCH: the UE can use the Rx beam configured to receive the control signaling to receive the PDSCH; the UE can use the Rx beam that the UE uses to successfully decode the msg2 or msg4 in random access to receive the PDSCH; the UE can use the Rx beam that the UE uses to successfully decode the PBCH to receiver the PDSCH; and the UE can use the Rx beam that the UE uses to successfully detect synchronization signals.

In NR, the beam indication for a PDSCH is generally indicated by the "transmission configuration indication" filed in one DCI that schedules the PDSCH. One TCI (transmission configuration indicator) state can be signaled through the transmission configuration indication field. Each TCI state can be associated with one DL RS ID (for example, one CSI-RS resource, on SS/PBCH block) and the associated RS ID can indicate the spatial QCL reference.

When receiving the PDSCH, the UE may assume the DMRS antenna ports in the PDSCH are quasi co-located with the RS associated in the indicated TCI state with respect to Spatial Rx parameters. The UE may derive the spatial receive filter for the reception of PDSCH based on indicated TCI state. This function is used to realize the beam indication function. The information indicated by TCI state can tell the UE which Rx beam may be used to receive the PDSCH.

In one embodiment, the downlink DCI format 1_0 does not contain a transmission configuration indication field, i.e., the downlink DCI format 1_0 does not signal the Rx beam information for the PDSCH. For a PDSCH scheduled by DCI format 1_0, the UE can be requested to use one or more of the following embodiment.

In one embodiment, the UE can be requested to use the Rx beam used to receive the PDCCH (or control resource set) where the DCI format 1_0 is detected to receive the scheduled PDSCH. For the PDSCH scheduled by DCI format 1_0, the UE may receive the PDSCH by using the Rx beam that is used to receive the PDCCH that schedules the same PDSCH. In one example, if one PDSCH is scheduled by a DCI format 1_0, the UE may assume that the antenna ports of DM-RS of PDSCH are quasi co-located based on the TCI state used for PDCCH quasi-co-location indication of the PDCCH where the assignment DCI format 1_0 is detected.

In one embodiment, the UE can be requested to use the Rx beam used to receive msg2 or msg3 during random access procedure to receive a PDSCH scheduled by a DCI format 1_0. In one example, for a PDSCH scheduled by a DCI format 1_0, the UE may assume the antenna ports of DM-RS of PDSCH are quasi co-located with the QCL assumption used to receive msg2 or msg3 during random access procedure.

In one embodiment, for a PDSCH scheduled by a DCI format 1_0, the UE can assume the DM-RS antenna port associated with PDSCH reception is quasi co-located with the SS/PBCH block the UE identified during initial access procedure with respect to delay spread, Doppler spread, Dopper shift, average delay, and spatial Rx parameters when applicable.

In one example, for a PDSCH scheduled by a DCI format 1_0, the UE assumes that the TCI state for the PDSCH is identical to the TCI state applied for the CORESET used for the PDCCH transmission where that DCI format 1_0 scheduling that PDSCH is detected.

A multi-slot PDSCH can be scheduled by a DCI. When the UE is configured with aggregationFactorDL>1, the same symbol allocation is applied across the aggregationFactorDL consecutive slots. The UE may expect that the TB is repeated within each symbol allocation among each of the aggregationFactorDL consecutive slots and the PDSCH is limited to a single transmission layer. Such a PDSCH can be called a multi-slot PDSCH.

In one embodiment, for a multi-slot PDSCH, the UE can determine the QCL configuration to receive this PDSCH as one or more of the followings.

In one example, if the time offset between all the parts of one multi-slot PDSCH and the reception of the corresponding DL DCI is equal to or greater than a threshold Threshold-Sched-Offset, the UE can assume the antenna ports of one DM-RS port group of any part of this multi-slot PDSCH of a serving cell are quasi co-located with the RS(s) in the RS set with respect to the QCL type parameter(s) given by the indicated TCI state signaled in the corresponding DCI.

In one example, the UE can determine the QCL configuration for each part in one multi-slot PDSCH according to time offset from the reception of the DL DCI. In such example, for the part(s) of the multi-slot PDSCH whose time offset from the reception of the corresponding DL DCI is less than threshold Threshold-Sched-Offset, the UE can assume a default QCL configuration to receive that part. The example of default QCL configuration can be: one particular TCI state among the TCI states selected/activated/configured/indicated for PDSCH transmission (e.g., the first TCI state, the TCI state corresponding to TCI field=000 in DCI, the last TCI state), one default QCL configuration indicated by high layer, the QCL configuration indicated by the TCI state configured to the lowest-index CORESET in latest slot in the same CC, the SS/PBCH identified during initial access, the QCL configuration corresponding to the scheduling DCI.

In such example, for the part(s) of the multi-shot PDSCH whose time offset from the reception of the corresponding DL DCI is equal to or greater than threshold Threshold-Sched-Offset, the UE can assume the antenna ports of one DM-RS port group of that part of this multi-slot PDSCH of a serving cell are quasi co-located with the RS(s) in the RS set with respect to the QCL type parameter(s) given by the indicated TCI state signaled in the corresponding DCI.

In one embodiment, for the multi-slot PDSCH, the UE can determine the QCL configuration to receive this PDSCH as one or more of the followings.

In one example, if one or more part(s) of the multi-slot PDSCH has time offset from the reception of the corresponding DL DCI being less than the threshold Threshold-Sched-Offset, the UE can assume a default QCL configuration to receive the whole parts of the multi-slot PDSCH. The example of default QCL configuration can be: one particular TCI state among the TCI states selected/activated/configured/indicated for PDSCH transmission (e.g., the first TCI state, the TCI state corresponding to TCI field=000 in DCI, the last TCI state), one default QCL configuration indicated by high layer, the QCL configuration indicated by the TCI state configured to the lowest-index CORESET in latest slot in the same CC, the SS/PBCH identified during initial access, the QCL configuration corresponding to the scheduling DCI.

In one example, if all the parts of the multi-slot PDSCH has time offset from the reception of the corresponding DL DCI being equal to or greater than the threshold Threshold-Sched-Offset, the UE can assume the antenna ports of one DM-RS port group of any part of this multi-slot PDSCH of a serving cell are quasi co-located with the RS(s) in the RS set with respect to the QCL type parameter(s) given by the indicated TCI state signaled in the corresponding DCI.

For one PDSCH transmission, the gNB can transmit one "transmission configuration indication" field in the scheduling DCI to indicate one TCI state out of up to 8 TCI states that are activated in a MAC-CE message. Each codepoint of DCI field "transmission configuration indication" can indicate one TCI state from those up to 8 TCI states that activated in a MAC-CE message. On other hand, after the serving gNB send one MAC-CE message to activate a few TCI states, the indicating mapping between activated TCI states and codepoints of DCI field "transmission configuration indication" take effect after some time after the MAC-CE message is sent.

In particular, the indicating mapping may be applied starting from slot $n+3N_{slot}^{subframe,\mu}+1$, where the HARQ-ACK for the PDSCH carrying the MAC-CE for activation of TCI states is transmitted at slot n. Therefore, it can be observed that along time domain, the indicating mapping between activated TCI states and the codepoints of DCI field "transmission configuration indication" is switched at some slot. In general, one DCI sent at slot m can schedule a PDSCH transmission at slot m+A, where A can be zero (i.e., same-slot allocation) or larger than 0 (i.e., cross-slot allocation). One PDSCH allocation can occupy one slot or multiple slots (in this case, the PDSCH is called a multi-slot PDSCH).

If one PDSCH allocation spans multiple slots, the switching point of indicating mapping between activated TCI states and the codepoints of DCI field "transmission configuration indication" can happen within the time duration of one multi-slot PDSCH. In this scenario, it is required that the behavior of indicating mapping is defined so that the UE can assume correct TCI state and then correct QCL assumption for receiving the PDSCH.

In one embodiment, the serving gNB can apply the indicated TCI state that is based on the activated TCI states in the first slot of a scheduled multi-slot PDSCH. And the UE may use the indicated TCI state based on activated TCI states in the first slot of one multi-slot PDSCH to receive all the parts of one multi-slot PDSCH. The UE may assume that the DM-RS ports of all parts of one multi-slot PDSCH are quasi co-located with the RS(s) in the TCI state with respect to the QCL type parameter(s) given by the indicated TCI state that is based on the activated TCI states in the first slot of that multi-slot PDSCH.

Assuming one multi-PDSCH is scheduled in slots m1, m1+1, m1+2. The serving gNB can transmit this multi-PDSCH with the QCL configuration of one TCI state indicated by the DCI field "transmission configuration indication" that is mapped to activated TCI states that are active in slot m1 and the serving gNB applies the same QCL configuration to all parts of this PDSCH in slots m1, m1+1 and m1+2.

In one example, If the tci-PresentInDCI is set as "enabled'," the TCI field in DCI in the scheduling component carrier points to the activated TCI states in the scheduled component carrier or DL BWP and when the PDSCH is scheduled by DCI format 1_1, the UE may use the TCI-State according to the value of the "transmission configuration indication" field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability. When the UE is configured with a multi-slot PDSCH, the indicated TCI state may be based on the activated TCI states in the first slot of the slots with the scheduled multi-slot PDSCH.

In one embodiment, for a multi-slot PDSCH, the serving gNB can apply the QCL configuration per slot-basis. For each slot of one multi-slot PDSCH, the serving gNB can apply the QCL configuration based on the TCI states that are activated in that slot. If a indicating mapping between TCI states and codepoints of DCI field "transmission configuration indicator" happens during one multi-slot PDSCH, the serving gNB can apply QCL configuration of old activated TCI states on the slot(s) before the switching time and apply QCL configuration of new activated TCI states on the slots after the switching time. On the UE side, to receive one multi-slot PDSCH, the UE receive each slot based on the TCI states that are active in that slot.

To receive one slot of a multi-slot PDSCH, the UE can be requested to apply QCL assumption based on the indicating mapping between codepoints of DCI field "transmission configuration indication" and the TCI states that are active in that slot. Assuming one multi-PDSCH is scheduled in slots m1, m1+1, m1+2. The UE can receive slot m1 of that multi-PDSCH with the indicated TCI state based on the TCI states that are active in slot m1, and receive slot m1+1 of that multi-slot PDSCH with the indicated TCI state based on the TCI states that are active in slot m1+1, and receive slot m1+2 of that multi-PDSCH with the indicated TCI states based on the TCI states that are active in slot m1+2.

In one example, If the tci-PresentInDCI is set as "enabled," the TCI field in DCI in the scheduling component carrier points to the activated TCI states in the scheduled component carrier or DL BWP and when the PDSCH is scheduled by DCI format 1_1, the UE may use the TCI-State according to the value of the "transmission configuration indication" field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability [12, TS 38.331]. When the UE is configured with a multi-slot PDSCH, the indicated TCI state is determined on per slot basis and for each slot of a multi-slot PDSCH, the indicated TCI state may be based on the activated TCI states in the that slot of the slots with the scheduled multi-slot PDSCH.

In one embodiment, for a PDSCH scheduled by cross-carrier scheduling embodiment, i.e., the DCI scheduling the PDSCH is transmitted on carrier component (CC) #1 but the scheduled PDSCH is transmitted on component #2, the UE may determine the QCL assumption to receive the PDSCH as follows.

In one example, if the scheduling offset between the DCI and the transmission of PDSCH is less than a first threshold, the UE can use some pre-defined or pre-configured QCL assumption to receive the PDSCH. In such example, example of the pre-defined or pre-configured QCL assumption can be: one particular TCI state among the TCI states selected/activated/configured/indicated for PDSCH transmission (e.g., the first TCI state, the TCI state corresponding to TCI field=000 in DCI, the last TCI state), one default QCL configuration indicated by high layer, the QCL configuration indicated by the TCI state configured to the lowest-index CORESET in latest slot in the same CC, the SS/PBCH identified during initial access, the QCL configuration corresponding to the scheduling DCI.

In one example, if the scheduling offset between the DCI and the transmission of PDSCH is larger than or equal to the first threshold, the UE can use the QCL configuration indicated by the TCI field in scheduling DCI to receive the PDSCH.

In one example, if the scheduling DCI does not contain TCI field, for example DCI format 1_0, the UE can use some pre-defined or pre-configured QCL assumption to receive the PDSCH. In such example, example of the pre-defined or pre-configured QCL assumption can be: one particular TCI state among the TCI states selected/activated/configured/indicated for PDSCH transmission (e.g., the first TCI state, the TCI state corresponding to TCI field=000 in DCI, the last TCI state), one default QCL configuration indicated by high layer, the QCL configuration indicated by the TCI state configured to the lowest-index CORESET in latest slot in the same CC, the SS/PBCH identified during initial access, the QCL configuration corresponding to the scheduling DCI.

In one embodiment, a gNB can transmit a set of N SS/PBCH blocks and N can be >=1. Some information field delivered in a SS/PBCH block can configure a control resource set and a search space for this control resource. The UE can be requested identify one "good" SS/PBCH and then obtain the configuration information for control resource set and search space from the identified SS/PBCH block. To detection PDCCH on control resource set and search space that the UE identifies from one identified SS/PBCH block, the UE can be requested to assume the DMRS of PDCCH is spatial QCLed to the identified SS/PBCH block. Such a control resource set can be indexed by a fixed value, for example 0, which can be predefined and specified in specification. Here, all control resource set ID X (the value of X can be predefined and specified in specification).

In another embodiment, the UE can be configured with a SS/PBCH block index for control resource set ID X. When the UE is configured with a SS/PBCH index Y for control resource set ID X, the UE can be requested to obtain the configuration information (for example including frequency location, symbol length, symbol location and slot location, etc.) for control resource set ID X and also the configuration of search space from the information field delivered by SS/PBCH block index Y and then the UE can begin to monitor PDCCH on this control resource set and search space.

In one embodiment, if the UE is configured with a SS/PBCH block index Y for control resource ID X for which the configuration of control resource set and search space are configured by SS/PBCH block, then the UE can be requested to monitor PDCCH on this control resource ID X as follows.

In one example, the UE may obtain the control resource set configuration and the associated search space configuration from the SS/PBCH block index Y that is indicated by the system. The UE may assume such obtain control resource set configuration and search space configuration is the configuration for control resource set ID X and associated search space Z.

In one example, then the UE can be requested to monitor UE specific DCI formats by monitoring PDCCH in search space X and control resource set ID X.

In one embodiment, a UE can be configured with TCI state(s) for control resource set with ID #0 (i.e., control resource set with CORESET-ID=0) though the higher layer parameter TCI-StatesPDCCH. If there is one TCI state configured in higher layer parameter TCI-StatesPDCCH, the UE may use the RS ID for spatial Rx parameter (i.e., QCLType-D) in that TCI state to do the followings: identify one SS/PBCH block index i; then obtain a configuration of control resource set and a configuration of search space from the PBCH contained in the identified SS/PBCH block index i.

The UE can assume identified configuration of control resource set as the configuration for control resource with ID #0 and can assume the identified configuration of search space as the configuration of Type0-PDCCH common search space.

The UE can be requested to monitor DCI format(s) for unicast transmission. For example, the UE can be requested to monitor DCI formats 0_0/0_1/1_0/1_1 scrambled by C-RNTI or CS-RNTI or SP-CSI-RNTI.

To monitor PDCCH in control resource set with ID=0 and associated Type® PDCCH common search, the UE can assume the DMRS in reception of PDDCH is QCLed to the RS ID(s) contained in the configured TCI state. If there are multiple TCI states configured in TCI-StatesPDCCH for control resource set with ID #0, a MAC-CE selection command can be sent to the UE to select/activate one of those configured TCI states and the UE can be requested to operate as above described with that selected/activated TCI state.

In one embodiment, the RS ID for spatial Rx parameter(s) in TCI-StatesPDCCH is an SS/PBCH index j, then the UE can be requested to operate as above described by assume i=j. In one embodiment, the RS ID for spatial Rx parameter(s) in TCI-StatesPDCCH can be a CSI-RS resource index k. Then the UE may find SS/PBCH block index i that is spatial QCLed with the configured CSI-RS resource index k. And then the UE can be requested to operate as above described with the identified SS/PBCH block index i according to the configured CSI-RS resource index k.

In one embodiment, if a UE is NOT configured with TCI state for control resource set ID #0, the UE may monitor DCI format(s) for broadcast information on this control resource set ID #0 and Type0-PDCCH common search space, where the DCI formats the UE can monitor can be a DCI format with CRC scrambled by a SI-RNTI. If a UE is configured with TCI state for control resource set ID #0 through higher layer parameter and signaling, the UE may monitor DCI format(s) for unicast transmission information on this control resource set ID #0 and Type0-PDCCH common search space, where the DCI formats the UE can monitor can include a DCI format with CRC scrambled by a C-RNTI, CS-CNTI or SPS-CSI-RNTI.

The provided embodiment for CORESET #0 is useful to enable the system to use control resource set ID #0 that is configured through SS/PBCH and originally designed for broadcast information only to transmit unicast message to one UE. If the UE is not configured with TCI state for control resource set ID #0 from the NW, the UE can measure the RSRP of SS/PBCH blocks and then select one SS/PBCH block (for example, the UE can select the SS/PBCH with largest L1-RSRP or L1-RSRP>=some threshold). Here the UE identifies one SS/PBCH block by himself, then the UE can monitor the PDCCH in the control resource set and search space as configured by PBCH in the identified SS/PBCH block.

After the UE enters RRC_connection status (i.e., the RRC connection is completed), the UE can be configured with TCI state(s) for control resource set ID #0. The UE would be requested to monitored PDCCH on one control resource set and search space according to one SS/PBCH block that is indicated by the NW. Since this SS/PBCH block is indicated by the gNB, then gNB knows where the UE will monitor PDCCH. Therefore the gNB can send unicast transmission through the PDCCH on the control resource set and search space.

In one embodiment, a UE can assume the TCI states pool for control resource set ID #0 (i.e., CORESET #0, control resource set with CORESET-ID=0) is all the transmitted SS/PBCH blocks. And then in the MAC-CE message for TCI state indication for UE-specific PDCCH, the CORESET ID field is set to 0 and "TCI State ID" field in that MAC-CE message can be used to indicate one SS/PBCH block index as the antenna port quasi co-location (QCL) configuration for control resource set with ID=0.

By doing the embodiment provided in this embodiment, it does not need to use RRC message to configure K≥1 TCI states for control resource set #0 and the UE can be requested to assume all the SS/PBCH blocks are equivalently the configured TCI states (for QCL configuration) to control resource set #0, then the gNB only need to use TCI indication MAC-CE message to select one SS/PBCH block as the QCL configuration for the control resource set #0.

In one embodiment, a TCI state indication for UE-specific PDCCH MAC CE message can be used to indicate one SS/PBCH index as the QCL configuration for the control resource set with ID 0.

In one embodiment, a UE can be requested to assume the TCI states for control resource set #0 are all the SS/PBCH blocks as the QCL configuration for control resource set #0. When the UE receives a MAC-CE message with "CORESET ID" field set to 0 (i.e., the control resource set with CORESET ID=0), the UE can be requested to assume that the field of "TCI state ID" indicates one SS/PBCH block and the UE can assume the value of the field of "TCI state ID" is the index of one SS/PBCH block and this indicated SS/PBCH block is the antenna port QCL configuration for control resource set #0.

In one embodiment, a UE can assume it is not expected to receive RRC message to configure TCI state(s) for control resource set #0. If a UE receives higher layer signaling (for example RRC message) to configure TCI states for control resource set #0, the UE can be request to ignore this configuration. When the UE receives a TCI indication for UE-specific PDCCH MAC CE (control element) message, if the "CORESET ID" field in that MAC-CE CE is set to be 0 (i.e., the control resource set #0), the UE can be requested to assume the field "TCI state ID" in that MAC CE message indicates the index of one SS/PBCH block as the antenna port QCL configuration for control resource set #0. The value of the field "TCI state ID" is one index of one SS/PBCH block as the antenna port QCL configuration for control resource set #0.

In one embodiment, the UE can assume a UE-specific PDCCH MAC CE message is used to indicate one TCI state for CORESET #0. If a UE receives a UE-specific PDCCH MAC CE message with the field 'CORESET ID' in that message set to 0, the UE can assume that message indicates one TCI state for CORESET #0 and the field 'TCI state ID' in that MAC CE message indicates the index of one TCI state among those TCI states that are configured for that UE through higher layer parameters. The UE can assume the indicated TCI state provides quasi co-location information of the DM-RS antenna port for PDCCH detection in a UE-specific search space associated with CORESET #0. In one example, the UE can assume the CSI-RS or TRS for QCL-type D (or called spatial Rx parameter) in the indicated TCI state indicated for CORESET #0 is always configured with a SS/PBCH block (SSB) as the source for QCL assumption. In one example, the UE shall use a 'chain-rule' to derive one SSB index as the spatial QCL source for CORESET #0. With the indicated TCI state for CORESET #0 in a UE-specific PDCCH MAC CE message, the UE can be requested to find which SSB index is the spatial QCL source for the CSI-RS or TRS contained in the indicated TCI states for at least spatial Rx parameter property and then assume the determined SSB index provides the spatial QCL source (or called source of QCL type D, or source for spatial Rx parameter) for CORESET #0.

In one embodiment, in a TCI indication for UE-specific PDCCH MAC CE message, the UE may do: if the field "CORESET ID" is equal to 0 (i.e., control resource set #0 is indicated here), the UE may assume the value in field "TCI state ID" is used to indicate the index of one SS/PBCH block; and if the field "CORESET ID" is not 0, the UE may assume the value of the field "TCI state ID" indicates the TCI state identified by TCI-StateId configured in higher layer signaling (e.g., RRC). In other word, in the case, the UE may assume the value of the field "TCI state ID" indicates one of the TCI states configured to the indicated control resource set through higher layer signaling.

Figure 18:
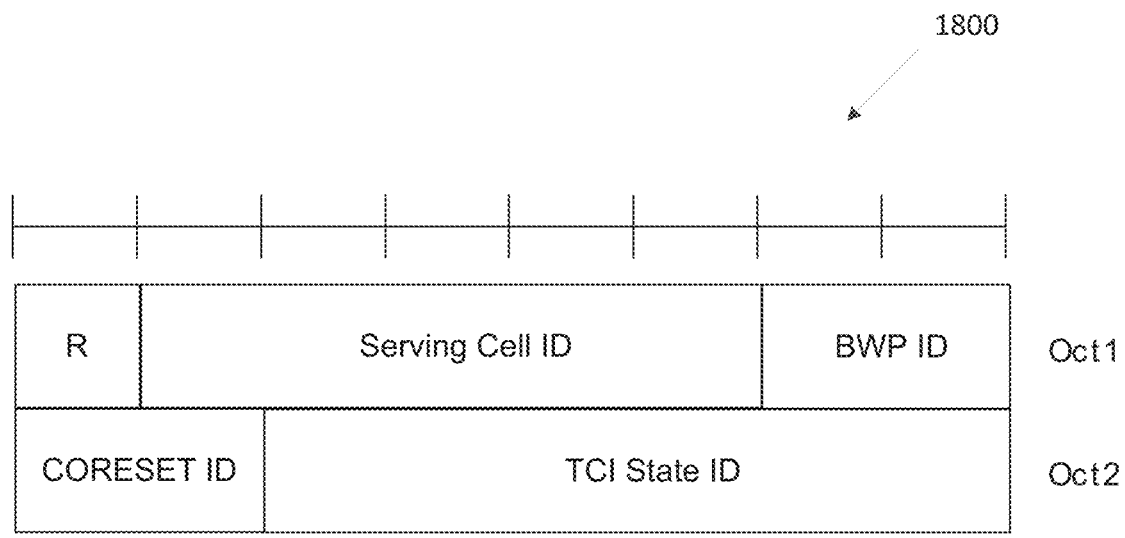
FIG. 18 illustrates an example message format according to embodiments of the present disclosure.

FIG. 18 illustrates an example message format 1800 according to embodiments of the present disclosure. The embodiment of the message format 1800 illustrated in FIG. 18 is for illustration only. FIG. 18 does not limit the scope of this disclosure to any particular implementation.

For the reference, the TCI state indication for UE-specific PDCCH MAC CE message is copied here, as illustrated in FIG. 18, which include one field "CORESET ID" to indicate the ID of control resource set.

Figure 19:
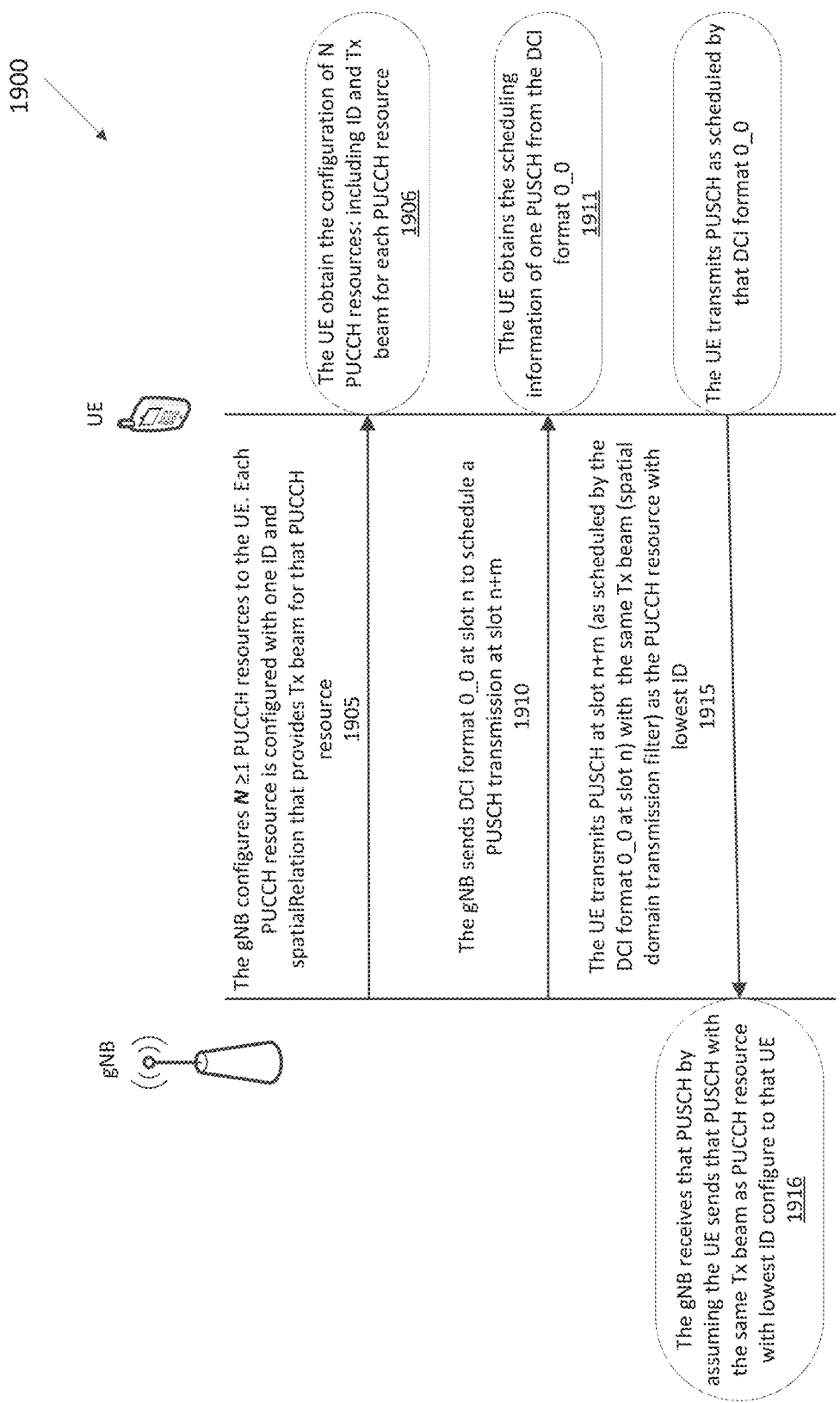
FIG. 19 illustrates a flowchart of a method for beam management according to embodiments of the present disclosure.

FIG. 19 illustrates a flow chart of a method 1900 for beam management according to embodiments of the present disclosure. The embodiment of the method 1900 illustrated in FIG. 19 is for illustration only. FIG. 19 does not limit the scope of this disclosure to any particular implementation.

As shown in FIG. 19, a gNB (e.g., 102 and 103 as illustrated in FIG. 1) at step 1905 configures N≥1 PUCCH resources to a UE (e.g., 111-116 as illustrated in FIG. 1). Each PUCCH resource is configured with one ID and spatialRelation that provides Tx beam for the PUCCH resource. The UE obtains, at step 1906, the configuration of N PUCCH resources including ID and Tx beam for each PUCCH resource. At step 1910, the gNB sends a DCI format 0_0 at slot n to schedule a PUSCH transmission at slot n+m. At 1911, the UE obtains the scheduling information of one PUSCH from the DCI format 0_0. The UE at step 1915, transmits PUSCH at slot n+m (as scheduled by the DCI format 0_0 at slot n) with the same Tx beam (spatial domain transmission filter) as the PUCCH resource with lowest ID. At step 1916, the gNB receives that PUSCH by assuming the UE sends that PUSCH with the same Tx beam as PUCCH resource with lowest ID configure to that UE.

Figure 20:
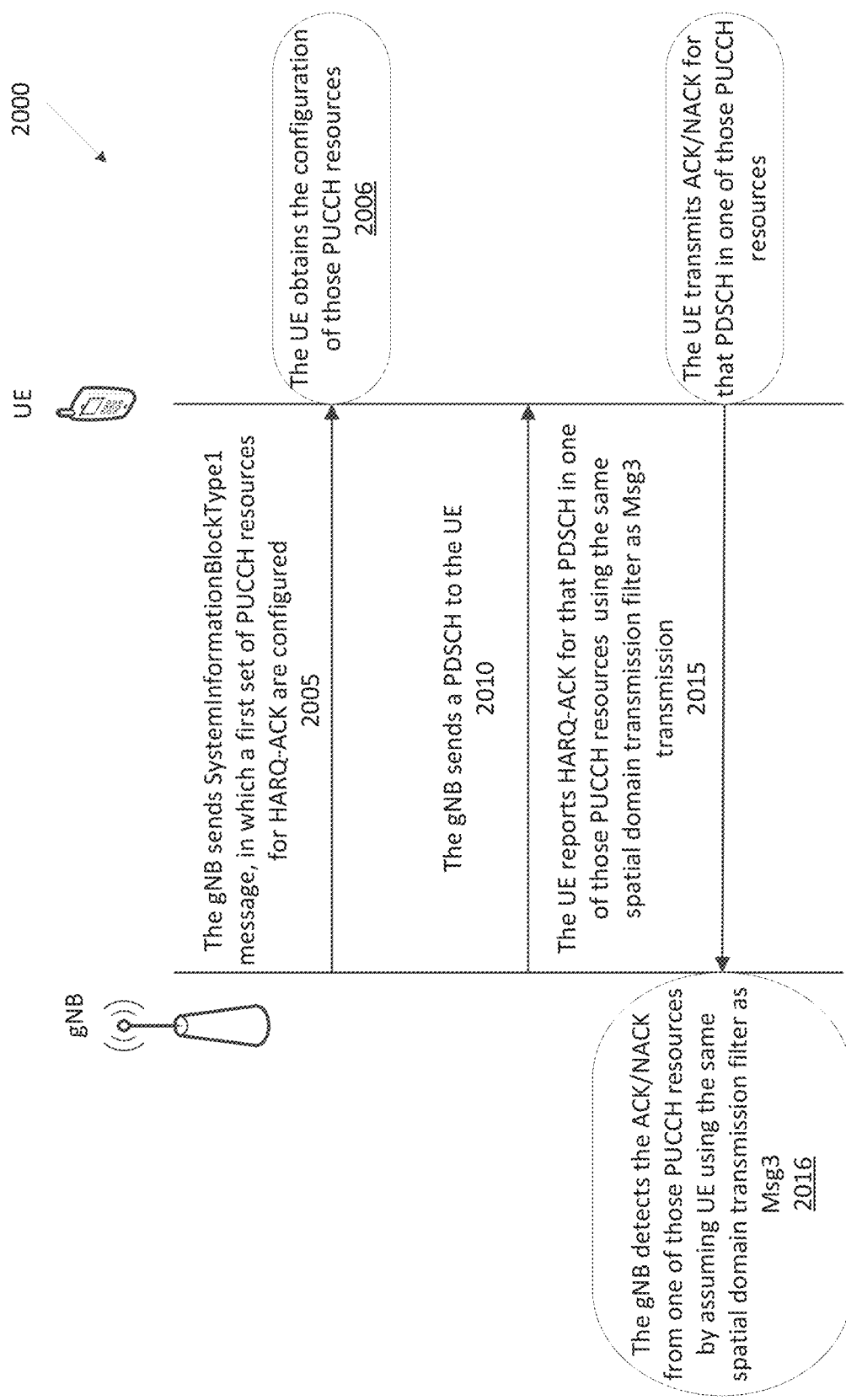
FIG. 20 illustrates another flowchart of a method for beam management according to embodiments of the present disclosure.

FIG. 20 illustrates another flow chart of a method 2000 for beam management according to embodiments of the present disclosure. The embodiment of the method 2000 illustrated in FIG. 20 is for illustration only. FIG. 20 does not limit the scope of this disclosure to any particular implementation.

As shown in FIG. 20, a gNB (e.g., 102 and 103 as illustrated in FIG. 1), at step 2005, sends SystemInformationBlockType1 message, in which a first set of PUCCH resources for HARQ-ACK are configured. At step 2006, the UE (e.g., 111-116 as illustrated in FIG. 1) obtains the configuration of those PUCCH resources. The gNB, at step 2010, sends a PDSCH to the UE. At step 2015, the UE reports HARQ-ACK for that PDSCH in one of those PUCCH resources using the same spatial domain transmission filter as Msg3 transmission. The gNB, at step 2016, detects the ACK/NACK from one of those PUCCH resources by assuming UE using the same spatial domain transmission filter as Msg3.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a transceiver configured to:
      receive, from a base station (BS), configuration information identifying a set of physical uplink control channel (PUCCH) resources, wherein each of the set of PUCCH resources is identified via an identifier (ID) and information associated with a transmit (Tx) beam; and
      receive, from the BS, a downlink control information (DCI) format to schedule a transmission over a physical uplink shared channel (PUSCH); and
   a processor operably connected to the transceiver, the processor configured to:
      identify scheduling information for the transmission over the PUSCH based on the DCI format; and
      identify a Tx beam for the PUSCH based on the configuration information for the set of PUCCH resources,
   wherein the transceiver is further configured to transmit, to the BS, data over the PUSCH based on the scheduling information using the Tx beam.

2. The UE of claim 1, wherein:
   the transceiver is further configured to receive, from the BS, a configuration of a set of common PUCCH resources in a system configuration message; and
   the processor is further configured to determine a Tx beam for transmission on the set of common PUCCH resources.

3. The UE of claim 2, wherein the transceiver is further configured to:
   apply, when transmitting on one of the set of common PUCCH resources configured in the system configuration message, a spatial domain transmission filter that is a same filter used to transmit a random access channel (RACH) message 3 (Msg3).

4. The UE of claim 1, wherein the processor is further configured to determine a Tx beam for the transmission over the PUSCH scheduled by the DCI format comprising a DCI format 0_0.

5. The UE of claim 4, wherein the processor is further configured to:
   identify the ID of each of the set of PUCCH resources; and
   apply, when transmitting the PUSCH scheduled by the DCI format 0_0, a spatial domain transmission filter that is a same filter applied to the transmission in the set of PUCCH resources with a lowest ID among IDs used in the set of PUCCH resources.

6. The UE of claim 1, wherein the information associated with the TX beam comprises spatial information including at least one of a channel state information-reference signal (CSI-RS) resource index, a secondary synchronization/physical broadcasting channel (SS/PBCH) block index, or a sounding reference signal (SRS) resource index.

7. A base station (BS) in a wireless communication system, the BS comprising:
   a processor configured to:
      identify a transmit (Tx) beam from a user equipment (UE) based on configuration information for each PUCCH resource in a set of PUCCH resources; and
   a transceiver operably connected to the processor, the transceiver configured to:
      transmit, to a UE, the configuration information identifying the set of PUCCH resources, wherein each of the set of PUCCH resources is identified via an identifier (ID) and information associated with the Tx beam;
      transmit, to the UE, scheduling information including a DCI format to schedule the UE with a transmission over a physical uplink shared channel (PUSCH); and
      receive, from the UE, data over the PUSCH based on the scheduling information using a receive (Rx) beam that corresponds to the Tx beam applied to a transmission over the PUSCH by the UE.

8. The BS of claim 7, wherein:
   the processor is further configured to determine a set of common PUCCH resources for a reception based on the configuration information included in a system configuration message; and
   the transceiver is further configured to transmit, to the UE, the system configuration message including the configuration information that configures the set of common PUCCH resources.

9. The BS of claim 8, wherein the processor is further configured to:
   determine the Rx beam for a reception on the set of common PUCCH resources configured in the configuration message; and
   apply, when receiving transmission on one of the set of PUCCH resources configured in system configuration information, a spatial domain receive filter that corresponds to a filter applied, by the UE, to a random access channel (RACH) message 3 (Msg 3) transmission.

10. The BS of claim 7, wherein the processor is further configured to determine the Rx beam for a reception over the PUSCH scheduled by the DCI format comprising a DCI format 0_0.

11. The BS of claim 10, wherein the processor is further configured to:
   identify the ID of each of the set of PUCCH resources; and
   apply, when receiving the PUSCH scheduled by the DCI format 0_0, a spatial domain receive filter that corresponds to a filter applied, by the UE, to the transmission in the set of PUCCH resources with a lowest ID among IDs used in the set of PUCCH resources.

12. The BS of claim 7, wherein the information associated with the TX beam comprises spatial information including at least one of a channel state information-reference signal (CSI-RS) resource index, a secondary synchronization/physical broadcasting channel (SS/PBCH) block index, or a sounding reference signal (SRS) resource index.

13. A method of a user equipment (UE) in a wireless communication system, the method comprising:
receiving, from a base station (BS), configuration information identifying a set of physical uplink control channel (PUCCH) resources, wherein each of the set of PUCCH resources is identified via an identifier (ID) and information associated with a transmit (Tx) beam;
receiving, from the BS, a downlink control information (DCI) format to schedule a transmission over a physical uplink shared channel (PUSCH);
identifying scheduling information for the transmission over the PUSCH based on the DCI format;
identifying a Tx beam for the PUSCH based on the configuration information for the set of PUCCH resources; and
transmitting, to the BS, data over the PUSCH based on the scheduling information using the Tx beam.

14. The method of claim 13, further comprising:
receiving, from the BS, a system configuration information that configures a set of common PUCCH resources; and
determining a Tx beam for a transmission on the set of common PUCCH resources.

15. The method of claim 14, further comprising:
applying, when transmitting on one of the set of common PUCCH resources configured in the system configuration information, a spatial domain transmission filter that is a same filter applied to a random access channel (RACH) message 3 (Msg 3) transmission.

16. The method of claim 13, further comprising:
determining a Tx beam for the transmission over the PUSCH scheduled by the DCI format comprising a DCI format 0_0;
identifying the ID of each of the set of PUCCH resources; and
using, when transmitting the PUSCH scheduled by the DCI format 0_0, a spatial domain transmission filter that is a same filter applied to the transmission in the PUCCH resources with a lowest ID among IDs used in the set of PUCCH resources.

17. The method of claim 13, wherein the information associated with the TX beam comprises spatial information including at least one of a channel state information-reference signal (CSI-RS) resource index, a secondary synchronization/physical broadcasting channel (SS/PBCH) block index, or a sounding reference signal (SRS) resource index.

* * * * *